(12) United States Patent
Rezvani

(10) Patent No.: US 10,228,695 B2
(45) Date of Patent: Mar. 12, 2019

(54) DRONE CONTROL DEVICE

(71) Applicant: Alarm.com Incorporated, Tysons, VA (US)

(72) Inventor: Babak Rezvani, Tysons, VA (US)

(73) Assignee: Alarm.com Incorporated, Tysons, VA (US)

(*) Notice: Subject to any disclaimer, the term of this patent is extended or adjusted under 35 U.S.C. 154(b) by 72 days.

(21) Appl. No.: 15/402,312

(22) Filed: Jan. 10, 2017

(65) Prior Publication Data
US 2017/0205827 A1 Jul. 20, 2017

Related U.S. Application Data

(60) Provisional application No. 62/280,928, filed on Jan. 20, 2016.

(51) Int. Cl.
*G05D 1/02* (2006.01)
*G05D 1/00* (2006.01)
(Continued)

(52) U.S. Cl.
CPC ............. *G05D 1/02* (2013.01); *B64C 39/024* (2013.01); *G05D 1/0022* (2013.01); *G06Q 10/00* (2013.01);
(Continued)

(58) Field of Classification Search
CPC ...... G05D 1/0022; G05D 1/02; G08B 13/196; G08B 1/1965; G08B 25/008; G08B 15/00;
(Continued)

(56) References Cited

U.S. PATENT DOCUMENTS 8,983,682 B1 3/2015 Peeters
2007/0063840 A1 3/2007 Jentoft
(Continued)

FOREIGN PATENT DOCUMENTS

DE 102017204261 1/2018
WO WO 2015/029007 3/2015

OTHER PUBLICATIONS

International Search Report in International Application No. PCT/US2017/014045, dated Apr. 7, 2017, 2 pages.
(Continued)

*Primary Examiner* — Mussa A Shaawat
(74) *Attorney, Agent, or Firm* — Fish & Richardson P.C.

(57) ABSTRACT

In one general aspect, a drone control device includes a body, a motor that is configured to move the body, a network module, an input module, and a processor. The network module is configured to communicate with a security system that monitors a property and receive data associated with a location within the property. The input module is configured to receive user input. The processor is configured to perform operations that include: determine, from among the location within the property and other locations within the property, a target location within the property; move the body to the target location within the property by providing a signal to the motor; receive, from the input module, input data that is associated with an operation of the security system; and in response to receiving the input data, perform the operation of the security system.

20 Claims, 10 Drawing Sheets

(51) Int. Cl.
*G08B 13/196* (2006.01)
*B64C 39/02* (2006.01)
*G06Q 10/00* (2012.01)
*G08B 25/00* (2006.01)
*G08B 15/00* (2006.01)
*G08B 15/02* (2006.01)
*G08B 25/14* (2006.01)

(52) U.S. Cl.
CPC ....... *G08B 13/196* (2013.01); *G08B 13/1965* (2013.01); *G08B 25/008* (2013.01); *B64C 2201/021* (2013.01); *B64C 2201/024* (2013.01); *B64C 2201/027* (2013.01); *B64C 2201/042* (2013.01); *B64C 2201/127* (2013.01); *G08B 15/00* (2013.01); *G08B 15/02* (2013.01); *G08B 25/14* (2013.01)

(58) Field of Classification Search
CPC ...... G08B 15/02; G08B 25/01; G08C 39/024; G08C 2201/127; G64C 2201/021; G64C 2201/024; G64C 2201/027; G64C 2201/042
See application file for complete search history.

(56) References Cited

U.S. PATENT DOCUMENTS

| | | |
|---|---|---|
| 2011/0102137 A1 | 5/2011 | Schroter |
| 2014/0316614 A1* | 10/2014 | Newman ............ G06Q 30/0611 701/3 |
| 2015/0246727 A1 | 9/2015 | Masticola |
| 2015/0339912 A1* | 11/2015 | Farrand .................. G08B 25/00 340/501 |
| 2016/0267759 A1* | 9/2016 | Kerzner ........... G08B 13/19645 |
| 2017/0185849 A1* | 6/2017 | High ..................... B64C 39/024 |
| 2017/0187993 A1* | 6/2017 | Martch ................ B64C 39/024 |
| 2017/0203841 A1* | 7/2017 | Myslinski ............ B64C 39/024 |
| 2017/0355076 A1* | 12/2017 | Gordon-Carroll ..... B25J 9/0003 |

OTHER PUBLICATIONS

EP Extended European Search Report in European Application No. 17741886.0, dated Jan. 2, 2019, 8 pages.

\* cited by examiner

300

```
┌─────────────────────────────────────────────────────────────┐
│ MONITORING DATA GENERATED BY ONE OR MORE DEVICES WITHIN A   │
│ PROPERTY                                                    │
│                                                         310 │
└─────────────────────────────────────────────────────────────┘
```

```
┌─────────────────────────────────────────────────────────────┐
│ DETERMINING AN ALARM STATUS ASSOCIATED WITH THE PROPERTY    │
│ BASED ON MONITORING THE DATA                                │
│                                                         320 │
└─────────────────────────────────────────────────────────────┘
```

```
┌─────────────────────────────────────────────────────────────┐
│ DETERMINING A LOCATION ASSOCIATED WITH THE OCCUPANT BASED ON│
│ MONITORING THE DATA                                         │
│                                                         330 │
└─────────────────────────────────────────────────────────────┘
```

```
┌─────────────────────────────────────────────────────────────┐
│ PERFORMING A PARTICULAR OPERATION AT THE LOCATION ASSOCIATED│
│ WITH THE OCCUPANT                                           │
│                                                         340 │
└─────────────────────────────────────────────────────────────┘
```

```
┌─────────────────────────────────────────────────────────────┐
│ TRANSMIT A SIGNAL INDICATING THE ALARM STATUS AND THE       │
│ PARTICULAR OPERATION PERFORMED                              │
│                                                         340 │
└─────────────────────────────────────────────────────────────┘
```

FIG. 3

500A
OBTAIN DATA INDICATING A SECURITY BREACH AT A PROPERTY
510A
IN RESPONSE, DETERMINE A LOCATION OF A USER WITHIN THE PROPERTY
520A
AUTOMATICALLY NAVIGATE TO THE LOCATION ASSOCIATED WITH THE USER
530A
PROIVDE AN INTERFACE FOR PERFORMING AN EMERGENCY ACTION TO THE USER AT THE LOCATION
540A
FIG. 5A 600A
OBTAIN DATA INDICATING THAT A USER HAS ENTERED A PROPERTY
610A
DETERMINE THAT ANOTHER USER ASSOCIATED WITH THE PROPERTY IS NOT PRESENTLY LOCATED WITHIN THE PROPERTY
620A
AUTOMATICALLY NAVIGATE TO AN ENTRANCE LOCATION OF THE USER
630A
PERFORMING A VERIFICATION OPERATION TO VERIFY THAT THE USER IS AUTHORIZED TO ENTER THE PROPERTY
640A
FIG. 6A

DRONE CONTROL DEVICE

CROSS-REFERENCE TO RELATED APPLICATION

This application claims the benefit of U.S. Provisional Patent Application No. 62/280,928 filed on Jan. 20, 2016 and entitled "DRONE CONTROL DEVICE," which is incorporated herein by reference in its entirety.

TECHNICAL FIELD

This disclosure relates to home monitoring technology.

BACKGROUND

Security companies often provide security services to residential and commercial properties. Security services may include monitoring properties for alarm events, which may include security breaches, floods, fires, or carbon monoxide poisoning. The properties may include a security panel that communicates alarm signal information to a central alarm station, which transmits a signal to dispatch emergency responders in response to detecting the presence of an alarm event.

SUMMARY

Techniques are described for using a drone control device as a replacement for a control panel of a property monitoring system. For example, the drone control device may automatously function as a drone device and also have the capability to monitor, control, and adjust the operations of components within a monitoring system. In this regard, a user (e.g., a property owner or occupant) may use the drone control device to monitor property-related information independently of a specified location and also perform various types of location-based surveillance operations. Use of the drone control device to monitor property information is therefore advantageous to the use of traditional drone devices to perform such operations because of drone control unit may control a monitoring system much like a control unit. In addition, use of the drone control device is also advantageous to the use of fixed location control units because the drone control device may autonomously navigate to different regions of the property, enabling the execution of location-specific monitoring operations in various circumstances.

For example, the drone control device may be capable of performing processing capabilities, periodically exchanging communications with other electronic devices within a property, and transmitting electronic alerts and notifications to authorized users in response to detecting an alarm event near or within the property. In some examples, the drone control device may be a fully autonomous device within a monitoring system. In other examples, the drone control device may be a complementary device to a security panel of a monitoring system.

In one general aspect, a drone control device includes a body, a motor that is configured to move the body, a network module, an input module, and a processor. The network module is configured to communicate with a security system that monitors a property and receive data associated with a location within the property. The input module is configured to receive user input. The processor is configured to perform operations that include: determine, from among the location within the property and other locations within the property, a target location within the property; move the body to the target location within the property by providing a signal to the motor; receive, from the input module, input data that is associated with an operation of the security system; and in response to receiving the input data, perform the operation of the security system.

In another general aspect, a computer-implemented method can include: receiving, by a drone control device that is associated with a security system that monitors a property, data associated with a location within the property; based on the data associated with the location within the property, determining, from among the location and other locations within the property, a target location within the property; automatically navigating, by the drone control device, to the target location within the property; receiving, by the drone control device, a user input that is associated with an operation of the security system; and performing, by the drone control device, the operation of the security system.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

FIG. 3 illustrates an example of a process for performing operations using a drone control device.

FIG. 5A illustrates an example of a process for automatically performing an emergency action using a drone control device.

FIG. 6A illustrates an example of a process for using a drone control device to verify the identity of a user who enters a property.

DETAILED DESCRIPTION

Figure 1:
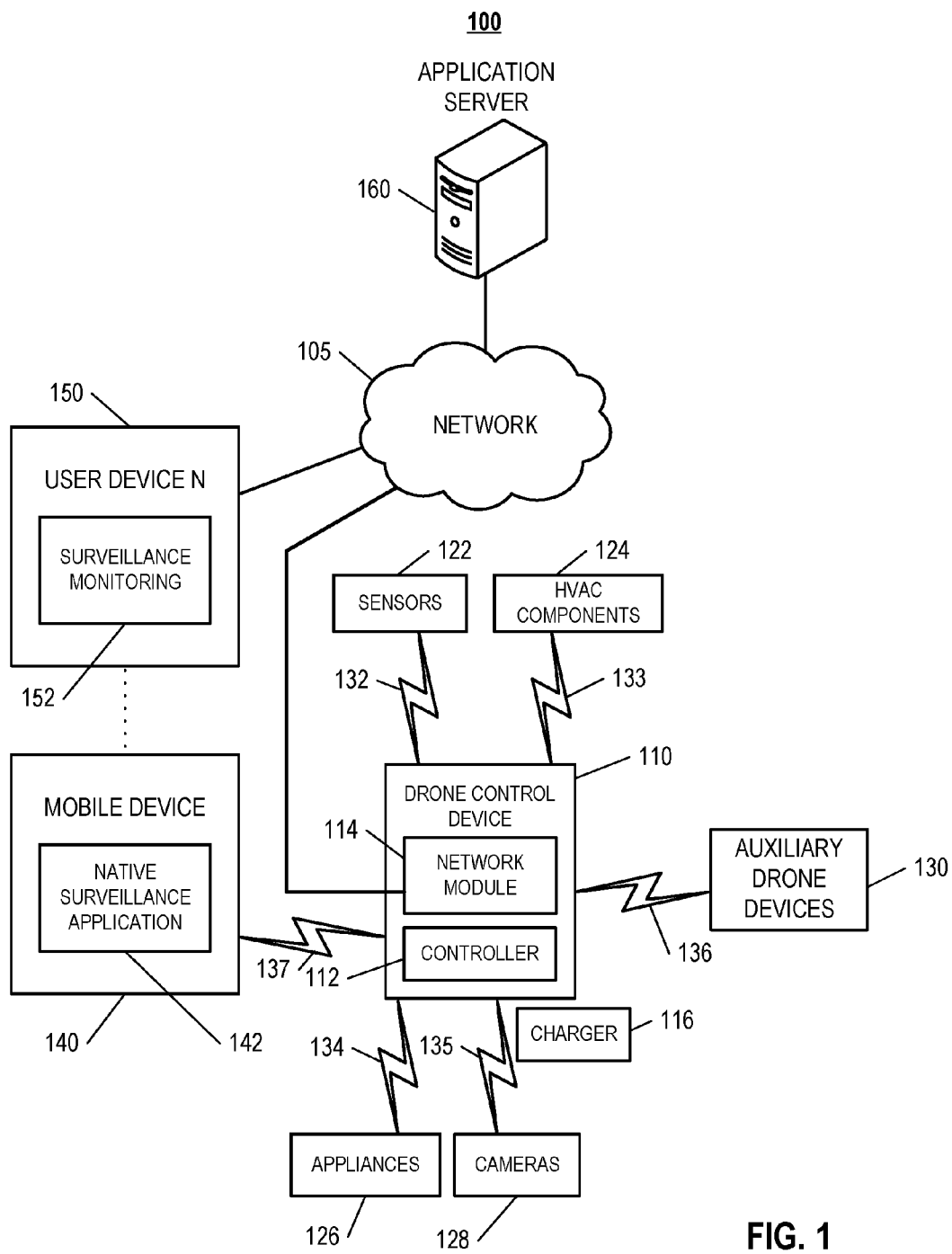
FIG. 1 illustrates a block diagram of an example of a system that includes a drone control device.

FIG. 1 illustrates a block diagram of an example of an electronic system 100 configured to perform monitoring control operations using a drone device. The electronic system 100 includes a network 105, a drone control device 110, sensors 122, HVAC components 124, appliances 126, cameras 128, auxiliary drone devices 130, one or more user devices 140, 150, and a monitoring application server 160.

The network 105 is configured to enable exchange of electronic communications between devices connected to the network 105. For example, the network 105 may be configured to enable exchange of electronic communications between the drone control device 110, the sensors 122, the HVAC components 124, the appliances 126, the cameras 128, the auxiliary drone devices 130, the one or more user devices 140, 150, and the monitoring application server 160. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The drone control device 110 may be an unmanned device that is capable of movement and monitoring the operations of devices located within a property. For example, the drone control device 110 may be capable of moving throughout a property based on automated control technology and/or control signals provided by either the user or by the application server 160. In such an example, the drone control device 110 may be able to fly, roll, walk, or otherwise move about a property. The drone control device 110 may include helicopter type devices (e.g., quad copters), rolling helicopter type devices (e.g., roller copter devices that can fly and also roll along the grounds, walls, or ceiling), land vehicle type devices (e.g., automated cars that drive around a property), and plane type devices (e.g., unmanned aircraft). In some instances, the drone control device 110 may be drone devices that are intended for other purposes and merely associated with the system 100 for use in appropriate circumstances. For instance, a security drone may be associated with the system 100 as the drone control device 110 and may be controlled to take action responsive to monitoring system events.

The drone control unit 110 includes a controller 112 and a network module 114. The controller 112 is configured to control a monitoring system (e.g., a home alarm or security system) that includes the drone control device 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the drone control device 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

In some implementations, components of the network module 114 may be located in a charging station associated with the drone control unit 110. These components of the network module 114 may be a wired communication module configured to exchange communications over the network 105 using a wired connection. For instance, the components of the network module 114 may be a modem, a network interface card, or another type of network interface device. The components of the network module 114 may also be an Ethernet network card configured to enable the drone control device 110 to communicate over a local area network and/or the Internet. The components of the network module 114 also may be a voiceband modem configured to enable the alarm panel to communicate over the telephone lines of Plain Old Telephone Systems (POTS). In such implementations, the drone control device 110 may utilize the wired components of the network module 114 to exchange wired data communications when docked at the charging station, and use wireless communications when not docked onto the charging station.

In some examples, drone control device 110 automatically navigates within a property. In these examples, the drone control device 110 include sensors and control processors that guide movement of the drone control device 110 within the property. For instance, the drone control device 110 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The drone control device 110 may include control processors that process output from the various sensors and control the drone control device 110 to move along a path that reaches the desired destination and avoids obstacles. In this regard, the control processors detect walls or other obstacles in the property and guide movement of the drone control device 110 in a manner that avoids the walls and other obstacles.

In addition, the drone control device 110 may store data that describes attributes of the property. For instance, the drone control device 110 may store a floorplan and/or a three-dimensional model of the property that enables the drone control device 110 to navigate the property. During initial configuration, the drone control device 110 may receive the data describing attributes of the property, determine a frame of reference to the data (e.g., a home or reference location in the property), and navigate the property based on the frame of reference and the data describing attributes of the property. Further, initial configuration of the drone control device 110 also may include learning of one or more navigation patterns in which a user provides input to control the drone control device 110 to perform a specific navigation action (e.g., fly to an upstairs bedroom and spin around while capturing video and then return to a home charging base). In this regard, the drone control device 110 may learn and store the navigation patterns such that the drone control device 110 may automatically repeat the specific navigation actions upon a later request.

In some examples, the drone control device 110 may include data capture and recording devices. In these examples, the drone control device 110 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property.

In some implementations, the drone control device 110 may include output devices. In these implementations, the drone control device 110 may include one or more displays, one or more speakers, one or more projectors, and/or any type of output devices that allow the drone control device 110 to communicate information to a nearby user. The one or more projectors may include projectors that project a two-dimensional image onto a surface (e.g., wall, floor, or ceiling) and/or holographic projectors that project three-dimensional holograms into a nearby space.

The drone control device 110 also may include a communication module that enables the drone control device 110 to communicate other devices of the system 100. The communication module may be a wireless communication module that allows the drone control device 110 to communicate wirelessly. For instance, the communication module may be a Wi-Fi module that enables the drone control device 110 to communicate over a local wireless network at the property. The communication module further may be a 900 MHz wireless communication module that enables the drone control device 110 to communicate directly with a monitoring system control unit. Other types of short-range wireless communication protocols, such as Bluetooth, Bluetooth LE, Zwave, ZigBee, etc., may be used to allow the drone control device 110 to communicate with other devices in the property.

The drone control device 110 further may include processor and storage capabilities. The drone control device 110 may include any suitable processing devices that enable the drone control device 110 to operate applications and perform the actions described throughout this disclosure. In addition, the drone control device 110 may include solid state electronic storage that enables the drone control device 110 to store applications, configuration data, collected sensor data, and/or any other type of information available to the drone control device 110.

The drone control device 110 may be associated with the charging station 116. The charging station 116 may be located at a predefined or reference locations within the property. The drone control device 110 may be configured to navigate to the charging station 116 after completion of tasks needed to be performed for the system 100. For instance, after completion of an operation or upon instruction by the drone control device 110, the drone control device 110 may be configured to automatically fly to and land on the charging station 116. In this regard, the drone control device 110 may automatically maintain a fully charged battery in a state in which the drone control device 110 are ready for use by the system 100.

The charging station 116 may be contact-based charging stations and/or wireless charging stations. For contact based charging stations, the drone control device 110 may have readily accessible points of contact that the drone control device 110 are capable of positioning and mating with a corresponding contact on the charging station 116. For instance, a helicopter type drone device may have an electronic contact on a portion of its landing gear that rests on and mates with an electronic pad of a charging station when the helicopter type drone device lands on the charging station 116. The electronic contact on the drone device may include a cover that opens to expose the electronic contact when the drone device is charging and closes to cover and insulate the electronic contact when the drone device is in operation.

For wireless charging stations, the drone control device 110 may charge through a wireless exchange of power. In these cases, the drone control device 110 need only locate themselves closely enough to the wireless charging stations for the wireless exchange of power to occur. In this regard, the positioning needed to land at a predefined home base or reference location in the property may be less precise than with a contact-based charging station. Based on the drone control device 110 landing at a wireless charging station, the wireless charging station outputs a wireless signal that the drone control device 110 receive and convert to a power signal that charges a battery maintained on the drone control device 110.

In some implementations, the energy source for the auxiliary drone device 130 may include emerging fuel sources such as hydrogen fuel. For instance, the auxiliary drone device 130 can include a fuel cell that combines hydrogen and oxygen to produce energy, electricity, heat and water. For example, the fuel cell can be used to convert energy produced by the chemical reaction between hydrogen and oxygen to generate usable electric power to operate the auxiliary drone device 130.

The drone control device 110 may exchange communications with the sensors 122, the HVAC components 124, the appliances 126, the cameras 128, auxiliary drone devices 130, and the one or more user devices 140, 150 using communication links 132, 133, 134, 135, 136, and 137, respectively. The communication links 132, 133, 134, 135, 136, and 137 may be a wired or wireless data pathway configured to transmit signals from the sensors 122, the HVAC components 124, the appliances 126, the cameras 128, auxiliary drone devices 130, and the one or more user devices 140, 150 to the controller 112. The sensors 122, the HVAC components 124, the appliances 126, the cameras 128, auxiliary drone devices 130, and the one or more user devices 140, 150 may continuously transmit sensed values to the controller 112, periodically transmit sensed values to the drone control device 110, or transmit sensed values to the drone control device 110 in response to a change in a sensed value.

The communication links 132, 133, 134, 135, 136, and 137 may include a local network. The sensors 122, the HVAC components 124, the appliances 126, the cameras 128, auxiliary drone devices 130, and the one or more user devices 140, 150 and the drone control device 110 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

In some implementations, the drone control device 110 may perform routine surveillance operations on a property. For instance, the drone control device 110 may be assigned to one or more particular properties within a geographic location and may routinely collect surveillance footage during specified time periods (e.g., after dark), which may then be transmitted to the application server 160 for transmitting back to each particular property owner. In such implementations, the property owner may receive the surveillance footage over the network 105 as a part of a service provided by a security provider that operates the application server 160. For example, transmissions of the surveillance footage collected by the drone control device 110 may be part of a premium security service package provided by a security provider in addition to the routine drone emergency response service.

In some implementations, the drone control device 110 may monitor the operation of the electronic devices of the system 100 such as the sensors 122, the HVAC components 124, the appliances 126, the cameras 128, and/or the auxiliary drone devices 130. For instance, the drone control device 110 may enable or disable the devices of the system 100 based on a set of rules associated with energy consumption, user-specified settings, and/or other information associated with the conditions near or within the property where the system 100 is located. In some examples, the drone control device 110 may be used as a replacement to a traditional security panel (or monitor control unit) that is used to monitor and control the operations of the system 100. In other examples, the drone control device 110 may coordinate monitoring operations with a separate security panel of the system 100. In such examples, the drone control device 110 may monitor particular activities of the devices of the system 100 that are not monitored by the security panel, or monitor the operation of particular devices that are not monitoring by the security panel.

In some implementations, the drone control device 110 may perform a set of reoccurring behaviors associated with user activities. For instance, the drone control device 110 may receive a set of instructions that specify a set of user activities and triggers associated with the set of user activities that cause the drone control device 110 to perform the set of reoccurring behaviors. For example, the drone control device 110 may be used to monitor prescription usage associated with a treatment plan and transport a periodic dosage amount in response to determining that the user needs to take a prescription medication. In such an example, the drone control device 110 may automatically retrieve the appropriate amount of the prescription medication from one region of a property and deliver the prescription medication to another region of the property.

In some implementations, the drone control device 110 may include an audible detection apparatus that is capable of perform particular operations based on detecting audible patterns within a property. For instance, the drone control device 110 may roam around the property and in response to detecting an audible tone, the audible detection apparatus may record the audible tone, and compare the recording against a repository that maps a set of audible tones to different actions to be performed. In response to matching the recording to an audible tone within the repository, the drone control device 110 may perform the corresponding action specified by the reposition for the matched audible tone. For example, in response to detecting a user whistle, the drone control device 110 may generate a plurality of frequency signals that are each unique to a particular action to be performed. In some instances, the frequency signals may be used to perform actions in response to audible tones that are beyond human hearing capabilities.

The system 100 also includes one or more sensors or detectors. For example, the monitoring system may include multiple sensors 122. The sensors 122 may include a contact sensor, a motion sensor, a glass break sensor, or any other type of sensor included in an alarm system or security system. The sensors 122 also may include an environmental sensor, such as a temperature sensor, a water sensor, a rain sensor, a wind sensor, a light sensor, a smoke detector, a carbon monoxide detector, an air quality sensor, etc. The sensors 122 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 122 may include a radio-frequency identification (RFID) sensor that identifies a particular article that includes a pre-assigned RFID tag.

The HVAC components 124 may be electronic devices that may be configured to a heating, ventilating, and air conditioning (HVAC) system of a property where the system 100 is located. The HVAC components 124 may include, for example, a thermostat, a furnace, a humidifier, a dehumidifier, an air conditioner, or other devices associated with the HVAC system of the property. The drone control device 110 may be configured to control the operation of the HVAC system associated with the property. In some instances, the drone control device 110 may monitor temperature and/or energy consumption of the HVAC system associated with the property based on receiving data related to activity and/or environmental data near or within the property and, in response, control the operation of the HVAC components 124. For example, the drone control device 110 may enable or disable one or more of the HVAC components 124 based on monitoring the temperature and/or energy consumption of the HVAC system associated with the property.

The appliances 126 may be home automation devices connected to the network 105 that are configured to exchange electronic communications with other devices of the system 100. The appliances 126 may include, for example, connected kitchen appliances, controllable light sources, safety and security devices, energy management devices, and/or other types of electronic devices capable of exchanging electronic communications over the network 105. In some instances, the appliances 126 may periodically transmit information and/or generated data to the drone control unit 110 such that the drone control unit 110 can automatically control the operation of the appliances 126 based on the exchanged communications. For example, the drone control unit 110 may operate one or more of the appliances 126 based on a fixed schedule specified by the user. In another example, the drone control unit 110 may enable or disable one or more of the appliances 126 based on received sensor data from the sensors 122.

The cameras 128 may be video/photographic cameras or other type of optical sensing devices configured to capture images. For instance, the cameras 128 may be configured to capture images of an area within a building monitored by the drone control device 110. The cameras 128 may be configured to capture single, static images of the area and also video images of the area in which multiple images of the area are captured at a relatively high frequency (e.g., thirty images per second). The cameras 128 may be controlled based on commands received from the drone control device 110.

The cameras 128 may be triggered by several different types of techniques. For instance, a Passive Infra Red (PIR) motion sensor may be built into the cameras 128 and used to trigger the cameras 128 to capture one or more images when motion is detected. The cameras 128 also may include a microwave motion sensor built into the camera and used to trigger the cameras 128 to capture one or more images when motion is detected. The cameras 128 may have a "normally open" or "normally closed" digital input that can trigger capture of one or more images when external sensors (e.g., the sensors 122, PIR, door/window, etc.) detect motion or other events. In some implementations, the cameras 128 receives a command to capture an image when external devices detect motion or another potential alarm event. The cameras 128 may receive the command from the controller 112 or directly from one of the sensors 122.

In some examples, the cameras 128 trigger integrated or external illuminators (e.g., Infra Red, Z-wave controlled "white" lights, etc.) to improve image quality when the scene is dark. An integrated or separate light sensor may be used to determine if illumination is desired and may result in increased image quality.

The cameras 128 may be programmed with any combination of time/day schedules, system "arming state", or other variables to determine whether images should be captured or not when triggers occur. The cameras 128 may enter a low-power mode when not capturing images. In this case, the cameras 128 may wake periodically to check for inbound messages from the controller 112. The cameras 128 may be powered by internal, replaceable batteries if located remotely from the monitoring control unit 110. The cameras 128 may employ a small solar cell to recharge the battery when light is available. Alternatively, the cameras 128 may be powered by the power supply of the controller 112 if the cameras 128 are co-located with the controller 112.

In some implementations, the cameras 128 communicate directly with the monitoring application server 160 over the Internet. In these implementations, image data captured by the cameras 128 does not pass through the drone control device 110 and the cameras 128 receives commands related to operation from the monitoring application server 160.

The auxiliary drone device 130 may be an unmanned device that is capable of movement that are subordinate to the drone control device 110. For example, the auxiliary drone device 130 may be other drone devices that lack the operational capabilities of the drone control device 110 to be used as a replacement for a control unit of a monitoring system. The auxiliary drone devices 130 may be capable of moving throughout a location based on automated control technology and/or user input control provided by either the user or by the drone control device 110. In such an example, the auxiliary drone device 130 may be able to fly, roll, walk, or otherwise move about a location. The auxiliary drone device 130 may include helicopter type devices (e.g., quad copters), rolling helicopter type devices (e.g., roller copter devices that can fly and also roll along the grounds, walls, or ceiling), land vehicle type devices (e.g., automated cars that drive around a property), and plane type devices (e.g., unmanned aircraft). In some instances, the auxiliary drone device 130 may be a drone device that is intended for other purposes and merely associated with the system 100 for use in appropriate circumstances. For instance, a security drone may be associated with the system 100 as the auxiliary drone device 130 and may be controlled to take action responsive to monitoring system events by the drone control device 110. The auxiliary drone devices 130 may also include associated wireless or wired chargers that are similar to the charger 116 described above.

The one or more user devices 140, 150 may be electronic devices associated with a property owner or an occupant that exchange network communications over the network 105. For example, the one or more user devices 140, 150 may be smartphones, tablets, personal computers (PCs), network-enabled media players, home entertainment systems, cloud storage devices, and other types of network devices. The one or more user devices 140, 150 may access a service made available by the monitoring application server 160 on the network 105, such as a mobile application. The data generated by the one or more user devices 140, 150 may include over the network 105, which may be monitored by the drone control device 110.

The one or more user devices 140, 150 are devices that host and display user interfaces. For instance, the user devices 140, 150 may be mobile devices that host one or more native applications (e.g., the native surveillance applications 142 and 152). The user devices 140, 150 may a cellular phone or a non-cellular locally networked device with a display. The user devices 140, 150 may also include one or more of a cell phone, a smart phone, a tablet computing device, a laptop computing device, a desktop computing device, a personal digital assistant ("PDA"), a network-enabled wearable device, an electronic personal assistant device, or any other portable device configured to communicate over a network and display information. For example, implementations may also include electronic organizers, mobile devices, multimedia devices, or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interface and features described throughout. The user device 140 may load or install the native surveillance application 142 based on data received over a network or data received from local media. The native surveillance application 142 may run on any suitable mobile or desktop operating system. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the drone control device 110 over the network 105. The user device 150 may be configured to display a surveillance monitoring user interface that is generated by the user device 150 (e.g., through the native surveillance application 152) or generated by the monitoring application server 160 (e.g., through a webpage). For example, the user device 150 may be configured to display a user interface (e.g., a web page) provided by the monitoring application server 160 that enables a user to perceive images captured by the cameras 128 and/or reports related to the monitoring system. Although FIG. 1 illustrates two user devices for brevity, actual implementations may include more (and, perhaps, many more) or fewer user devices.

In some implementations, the one or more user devices 140, 150 communicate with and receive monitoring system data from the drone control device 110 using the communication link 138. For instance, the one or more user devices 140, 150 may communicate with the drone control device 110 using various local wireless protocols such as wifi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the drone control device 110, the one or more user devices 140, 150 may communicate directly with the sensors and other devices controlled by the drone control device 110. In some implementations, the one or more user devices 140, 150 replace the drone control device 110 and perform the functions of the drone control device 110 for local monitoring and long range/offsite communication.

In other implementations, the one or more user devices 140, 150 receive monitoring system data captured by the drone control device 110 through the network 105. The one or more user devices 140, 150 may receive the data from the drone control device 110 through the network 105 or the monitoring application server 160 may relay data received from the drone control device 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch between the one or more user devices 140, 150 communicating with the drone control device 110 directly (e.g., through link 138) or through the monitoring application server 160 (e.g., through network 105) based on a location of the one or more user devices 140, 150. For instance, when the one or more user devices 140, 150 are located close to the drone control device 110 and in range to communicate directly with the drone control device 110, the one or more user devices 140, 150 use direct communication. When the one or more user devices 140, 150 are located far from the drone control device 110 and not in range to communicate directly with the drone control device 110, the one or more user devices 140, 150 communicate through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 100 only includes the one or more user devices 140, 150, the sensors 122, the HVAC components 124, the appliances 126, the cameras 128, and the drone control device 110. The one or more user devices 140, 150 receive data directly from the sensors 122, the HVAC components 124, the appliances 126, the cameras 128, and the drone control device 110, and send data directly to these devices. The one or more user devices 140, 150 provide the appropriate interfaces/processing to provide visual surveillance and reporting.

The monitoring application server 160 is an electronic device configured to provide monitoring services by exchanging electronic communications with the drone control device 110, the one or more user devices 140, 150, and the application server 160 over the network 105. For example, the monitoring application server 160 may be configured to monitor events (e.g., alarm events) generated by the drone control device 110. In this example, the monitoring application server 160 may exchange electronic communications with the network module 114 included in the drone control device 110 to receive information regarding events (e.g., alarm events) detected by the drone control device 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the application server 160. For example, the monitoring application server 160 may transmit the alarm data to the application server 160 over the network 105.

The monitoring application server 160 may store sensor and image data received from the monitoring system and perform analysis of sensor and image data received from the monitoring system. Based on the analysis, the monitoring application server 160 may communicate with and control aspects of the drone control device 110 or the one or more user devices 140, 150.

In some implementations, the system 100 intelligently leverages the drone control device 110 to aid in security monitoring, property automation, and property management. For example, the drone control device 110 may aid in investigating alarm events detected at the property by the drone control device 110. In this example, the drone control device 110 may detect an alarm event (e.g., a fire alarm, an entry into the property when the system is armed "Stay," etc.) and, based on the detected alarm event, control the drone control device 110 to attempt to identify persons in the property at the time of the alarm event. In some instances, the drone control device 110 may directly investigate persons in the property at the time of the alarm event.

Alternatively or additionally, the drone control device 110 may send a control command to each of the auxiliary drone devices 130 that causes the devices to perform a coordinated and automated search for persons in the property. Based on the control command received, each of the auxiliary drone devices 130 begins navigating the property and captures images of the property while navigating. Each of the auxiliary drone devices 130 may then execute a predefined navigation pattern within the property. In other instances, the drone control device 110 may execute a coordinated scan of certain regions of the property, and then exchange location information for the regions of the property that have already been inspected by the drone control device 110 so that the auxiliary drone devices 130 may navigate to areas that have not been explored by other drone devices.

In some examples, the drone control device 110 may analyze the images captured during the scan of the property for the presence of persons in the captured images. For instance, the drone control device 110 may use image processing techniques in an attempt to identify shapes in the captured images that resemble a human body. The drone control device 110 also may analyze the images for moving objects (or use other techniques to identify moving objects) and target imaging on capture of moving objects. Based on detection of a human or a moving object, the drone control device 110 may lock onto the human or moving object and follow the human or moving object throughout the property. In this regard, the drone control device 110 may follow the human or moving object throughout the property and capture images of the movement.

In some implementations, the image analysis operations may additionally or alternatively performed by one or more of the auxiliary drone devices 130. For instance, once one of the auxiliary drone devices 130 locks onto a human or moving object, this device may coordinate with the other auxiliary drone devices 130 to ensure that multiple devices do not lock onto the same human or moving object.

The drone control device 110 may control the coordination of the auxiliary drone devices 130, or the drone auxiliary devices 130 may be autonomously controlled by one or more of the auxiliary drone devices 130. The coordination may involve sharing the location of the human or moving object and/or attributes of the human or moving object being imaged. Based on the shared location and attributes, the drone control device 110 may determine whether multiple auxiliary drone devices 130 have locked onto the same object and take action accordingly. If the drone control device 110 determines that the auxiliary drone devices 130 have not locked onto the same object, the appropriate one of the auxiliary drone devices 130 continues to lock onto the object while the other drone devices scan other areas of the property for other objects. If the drone control device 110 determine that the auxiliary drone devices 130 have locked onto the same object, the drone control device 110 may negotiate to determine which of the auxiliary drone devices 130 will continue to lock onto the object while the other drone devices stop locking onto the object and scan other areas of the property for other objects. The negotiation may select the drone device that continues tracking the object based on one or more factors including the timing of when the devices locked onto the object (e.g., which device locked onto the object first), the positioning of the devices relative to the object (e.g., which is best positioned to image the object), the amount of battery power remaining (e.g., the device with the most battery power remaining), or any other factor that indicates the device most suited to track the object. To the extent the device tracking an object becomes less suitable for tracking the object (e.g., the battery power is running low), the drone control device 110 may coordinate to hand off tracking of the object to another one of the auxiliary drone devices 130.

In some examples, the drone control device 110 may perform image recognition processing on the one or more images in an attempt to detect whether any identified humans are legitimate users of the property or intruders. In these examples, the drone control device 110 may have access to images of legitimate users of the property and may compare images being captured to the accessed images of legitimate users. Based on the comparison, the drone control device 110 use facial recognition techniques to determine whether the imaged user matches a legitimate user of the property or an intruder. The drone control device 110 then uses the determination of whether the imaged user matches a legitimate user of the property or an intruder to control further tracking operation.

For example, based on a determination that the imaged user is an intruder, the drone control device 110 may continue tracking the intruder and capture images that sufficiently identify the intruder. In this example, the drone control device 110 may attempt to capture biometric data from the intruder, such as voiceprint data, fingerprint data, and/or biological samples with DNA of the intruder. In addition, the drone control device 110 may take action to thwart the purpose of the intruder. For example, the drone control device 110 may fly in random patterns around the intruder, may play loud sounds near the intruder, may shine lights near the intruder, may output identifying information collected about the intruder (e.g., male, around six feet tall and one hundred eighty pounds), may enable a central station operator or first responder to talk to the intruder through a two-way voice communication session established through the drone control device 110 and the drone device, and may take other actions directed to disrupting the intruder.

Alternatively, based on a determination that the imaged user is a legitimate user, the drone control device 110 may discontinue tracking the legitimate user and scan for intruders. The drone control device 110 also may report the location of the legitimate user. The drone control device 110 further may continue tracking the legitimate user and attempt to provide assistance to the user. For instance, if the alarm is a fire alarm event, the drone control device 110 may stay near the legitimate user, continuously or periodically update the location of the legitimate user to assist another user or first responder in helping the legitimate user, provide audible reminders of what types of actions should be taken in a fire, enable a central station operator or first responder to talk to the legitimate user through a two-way voice communication session established through the drone control device 110 and the drone device, and may take other actions directed to assisting the legitimate user.

In some implementations, the auxiliary drone devices 130 may be assigned to different areas of the property where the devices can move in an unobstructed manner. In these examples, the auxiliary drone devices 130 may be assigned to different levels in a property (e.g., an upstairs drone device and a downstairs drone device) and even different rooms or sections that are potentially blocked by doors. The drone control device 110 coordinates tracking movement based on the assigned areas. For instance, the drone control device 110 determines areas in a property where an event has been detected (e.g., where motion is sensed, where a door or window is opened, etc.) and only controls the drone devices assigned to the determined areas to operate. In this regard, the drone control device 110 may use locations of users determined using sensors to control operation of the auxiliary drone devices 130.

In addition, the auxiliary drone devices 130 may be assigned as interior and exterior devices. The interior devices may navigate throughout an interior of the property. The exterior devices may navigate about an exterior periphery of the property. The exterior devices may be weather conditioned to remain outdoors (e.g., in an outdoor enclosure) at all times such that the exterior devices can explore an exterior of the property at any suitable time. In addition, the exterior devices may remain inside the property and the drone control device 110 may open a door to enable an exterior drone device to leave and return to the property. For instance, an exterior device may have a base or reference location in a garage of the property and the drone control device 110 may automatically open a garage door to allow the exterior device to leave the garage and explore the exterior of the property.

In some implementations, the drone control device 110 may monitor operational status of the auxiliary drone devices 130 and coordinate further operation based on the operational status. In these implementations, the drone control device 110 may detect that a particular drone device is no longer operational and control one or more other drone devices to perform operations originally assigned to the non-operational drone device. In addition, the drone control device 110 may determine that the non-operational drone device was navigating close to an intruder and received an impact based on accelerometer data prior to becoming non-operational. In this case, the drone control device 110 may infer that the drone device was smashed by the intruder and control other drone devices based on the inference. For instance, after inferring a smash event, the drone control device 110 may control operation of other drone devices to maintain distance from the intruder by only flying high overhead.

In some implementations, the drone control device 110 may determine battery power available for each of the auxiliary drone devices 130 and coordinate operation of the auxiliary drone devices 130 based on available battery power. In these implementations, the auxiliary drone devices 130 may report battery power remaining to the drone control device 110 and the drone control device 110 may determine a subset of the auxiliary drone devices 130 to deploy based on the battery power information. For instance, the drone control device 110 may select to initially deploy the drone device with the most available battery power to allow the other drone devices to charge while the selected device assists with monitoring. Once the battery power for the selected device falls below a threshold, the drone control device 110 may return the selected device to a charging station and select the drone device with the presently highest available battery power to resume the monitoring options being performed. The drone control device 110 may cycle through all of the auxiliary drone devices 130 in an intelligent manner that best leverages the battery power available. If the battery power of a device becomes too low to effectively operate as a navigating device, the drone control device 110 may control the drone device to remain stationary and act as a stationary camera or other sensor to still assist with monitoring, although the added benefit of navigation no longer exists.

In addition to battery, the drone control device 110 may select the drone device to deploy and what action to take based on the sensor that triggered the event, a time of day, and a state of the system. For instance, if the drone control device 110 detects an unusual motion sensor event, the drone control device 110 may select the nearest drone device to navigate to an area of the property where motion was detected and investigate. Alternatively, if the drone control device 110 detects a critical alarm event (e.g., a security breach of a system armed stay, a fire alarm, a carbon monoxide alarm, etc.), the drone control device 110 may deploy all auxiliary drone devices 130 at any time of the day. If the drone control device 110 detects an intrusion breach, the drone control device 110 may assign some devices to "attack" the intruder by disrupting the purpose of the intruder and collecting identifying information for the intruder and assign some devices to search for other users in the property. The selected devices and actions taken may vary based on sensor data, time of day, and the state of the monitoring system.

In some implementations, the system 100 allows central station operators, first responders, and/or users of the property to interact with and control the drone control device 110. In these implementations, a central station operator, first responder, or user of the property may provide input to control the drone control device 110 in a manner that best assists with monitoring and investigation of detected events. For instance, the central station operator, first responder, or user of the property may remotely control navigation of the drone control device 110. The central station operator, first responder, or user of the property also may provide general commands related to actions the drone control device 110 are designed to take. In response to these general commands, the drone control device 110 may automatically perform the desired actions, such as following an instruction to explore the property or following an instruction to navigate to an upstairs bedroom.

In some examples, the drone control device 110 may periodically perform test sequences to ensure the drone control device 110 will operate correctly if needed. In these examples, the drone control device 110 may periodically navigate predefined navigation patterns used to investigate the property and/or may navigate around the property in a scanning sequence. The drone control device 110 may determine whether the test sequences perform correctly or whether an error occurs that prevents full investigation of the property. To the extent an error occurs, the drone control device 110 reports the error and enable a user of the property or a technician to correct the error prior to a time when the drone control device 110 would be needed for safety monitoring.

The drone control device 110 also may arrange the test sequences to occur during periods of time that are convenient for users of the property. For example, the drone control device 110 may assess sensor data at the property and determine a time period in which the property is unoccupied and unlikely to be occupied until the test sequences complete. In this example, the drone control device 110 waits until the determined time period to initiate test sequences for one or more of the drone control device 110.

In some examples, the drone control device 110 may be used to provide a critical alert to a user in the property or attempt to wake a sleeping person as appropriate. In these examples, none of the users may be responding to a critical alert and, in response, the drone control device 110 may control the drone control device 110 to search for a person in the property and provide the critical alert very close to an identified person in a manner that is highly likely to gain the person's attention to the critical alert. In the event that the person appears to be sleeping in the property, the drone control device 110 may attempt to wake the person by providing loud output very near the person and/or by making contact with the person. In this regard, the drone control device 110 may be useful in waking a sleeping person when a fire or carbon monoxide alarm has been detected and the person needs to leave the property. The drone control device 110 also may determine when a person is nonresponsive (e.g., unconscious) and may be need of immediate assistance. Also, the drone control device 110 may serve as an alarm clock for critical meetings based on a person having trouble waking up using traditional alarm clocks.

Figure 2:
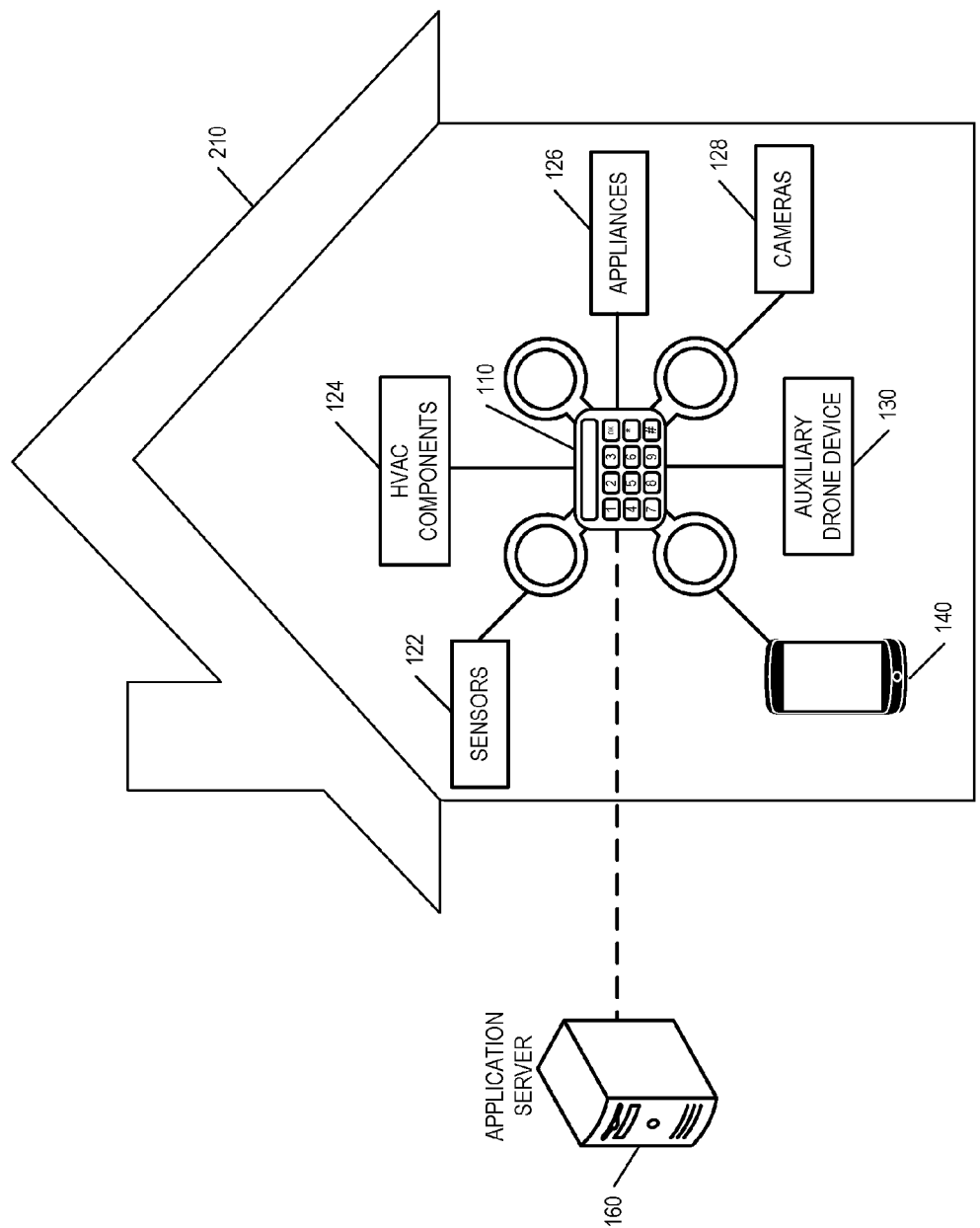
FIG. 2 illustrates a block diagram of an example of a property that includes a drone control device.

FIG. 2 illustrates a block diagram of an example of a property 210 that includes a drone control device 110. The components of the system 100 as depicted in FIG. 1 may be used to perform operations near or within a property 210. For instance, the drone control device 110 may exchange electronic communications with the sensors 122, the HVAC components 124, the appliances 126, the cameras 128, the auxiliary drone devices 130, the one or more user devices 140, 150, and/or the application server 160.

In general, as described with respect to FIG. 1, the drone control device 110 may exchange electronic communications with the devices of the system 100 to perform a variety of operations related to the property 210. For instance, the operations performed by the drone control device 110 may include, without limitation, security and surveillance operations to preemptively secure the premises of the property 210, arming and disarming a monitoring system (e.g., the system 100) associated with the property 210, monitoring and controlling the activities of connected devices (e.g., the appliances 126) near or within the property 210, and/or provide emergency response services during a detected alarm event at the property 210. In this regard, the drone control device 110 may be a fully autonomous component of the system 100 that periodically transmits information associated with the property 210 to a remote server (e.g., the application server 160). The descriptions below provide example implementations of the system 100 where the drone control device 110 performs particular implementations.

In some implementations, the drone control device 110 is capable of performing security and surveillance operations to preemptively secure the premises of the property 210. For instance, the drone control device 110 may assign a set of finite security states to the property based on information collected near or within the property 210. The security states may indicate a level of risk of the property 210 based on the information collected (e.g., number of doors/windows open, occupants present within the property 210, time of day, etc.). The information collected near or within the property 210 may be received from devices of the system 100 such as the sensors 122, the HVAC components 124, the appliances 126, the cameras 128, and/or the auxiliary drone device 130. For example, the drone control device 110 may receive occupancy data from the sensors 122 indicating when a property owner is presently outside the property 210, increasing the susceptibility to a security breach within the property. In other examples, the drone control device 110 may receive security footage of the exterior of the property 210 from the cameras 128 indicating certain exterior conditions such as the weather conditions that make the property 210 susceptible to environmental damage, or identifying individuals that are entering or exiting the property and whether they are authorized to enter the property (e.g., occupants, visitors, and/or potential trespassers). In other examples, the drone control device 110 survey the radiofrequency environment near or within the property 210 to detect the presence of unauthorized devices accessing information and/or performing surveillance of the property.

The security and surveillance operations performed by the drone control device 110 may be remotely accessible. For instance, the data collected by the drone control device 110 during security and surveillance operations (e.g., security footage from the cameras 128) may be accessible by a property owner using a remote user interface displayed on the one of the user devices 140, 150. In such instances, the drone control device 110 may be accessible using a user credential (e.g., a username and password) in order to authenticate the identity of the property owner remotely accessing data collected by the drone control device 110. In some examples, the drone control device 110 may be used to remotely control one or more of the devices of the system 100. For instance, the property owner may remotely access the security footage received by the drone control device 110 from the cameras 128 and adjust the video collection settings (e.g., adjusting video analytics, field of view, etc.).

The drone control device 110 may additionally be used to monitor activities related to a security system within the property 210. For instance, the drone control device 110 may monitor a setup or installation of a system or components, a maintenance operation, or other types of activities that require service personnel to enter the property 210. In such instances, the drone control device 110 may be configured to exchange electronic communications with the sensors 122 throughout the property 210 to track the progress of activities, determine if any issues arise, and transmit the collected information to either the property owner or the application server 160. For example, the drone control device 110 may periodically navigate through the property to where a scheduled operation is supposed to take place and capture video footage of the operation. In other examples, the drone control device 110 may use a personnel verification technique to determine if the identity of the service personnel matches information received from a service provider prior to providing access to the property 210 for the operation to be performed in the property 210.

In some implementations, the drone control device 110 is capable of enabling the arming and disarming of a monitoring system associated with the property 210. For instance, the drone control device 110 may use techniques verify the identity of an individual entering the property 210 and disarm the security system in response to determining that the identity of the individual entering the property 210 is valid. In some examples, the drone control device 110 may be capable of verifying the identity of an individual within different locations of the property. For instance, the drone control device 110 may initially detect the presence of an individual near a boundary of the property 210, and then navigate to the location where the presence is detected and use the techniques described to verify the identity of the individual entering the property 210. For example, the drone control device 110 may be capable of verifying the identity of an individual at the back entrance of the property 210 if the individual enters through the back entrance and similarly capable of verifying the identity of an individual at the front entrance of the property if the individual enters through the front entrance.

The drone control device 110 may use a variety of techniques to verify the identity of an individual entering the property 210. In some instances, the drone control device 110 may include a keypad that allows the individual to enter a designated security code to verify the identity of the individual. Alternatively, in other instances, the drone control device 110 may be capable of using more sophisticated user authentication techniques such as biometric authentication or time-dependable token authentication to verify the identity of the individual. For example, the drone control device 110 may use facial recognition to match the face of an individual to a list of authorized users that have been designated by the property owner to provide access to the property 210. In another example, the drone control device 110 may include a fingerprint sensor or a retinal scanner to accept biometric inputs from the individual and compare the biometric inputs to ones of authorized users.

The drone control device 110 may be capable of performing periodic verifications related to arming and disarming the security system of the property 210. For instance, in addition to providing an initial verification to arm and disarm the security system, the drone control device 110 may be configured to perform secondary verifications once an individual is already inside the property 210. For example, if an intruder initially uses false credentials to disarm the security system, the drone control device 110 may receive a subsequent signal indicating that the intruder falsely disarmed the system and in response, enable the security system and/or navigate to the location of the intruder to perform a subsequent verification using a more sophisticated verification technique. In this example, the drone control device 110 may be used to minimize security breaches resulting from fraudulent entrances within the property 210.

The drone control device 110 may use a variety of user interaction techniques while arming and disarming the security system of the property 210. For instance, the drone control device 110 may initially detect the location of a property owner and automatically move towards the property owner to initiate the arming or disarming process. The drone control device 110 may use different movement techniques to approach another user based on the location within the property 210. For example, the drone control device 110 may travel on the ground when navigating inside the property 210 and aerial transport when navigating outside the property 210. The drone control device 110 may also use spatial information associated with the property 210 (e.g., a floor plan, size of interior rooms, etc.) to determine the appropriate navigation technique to use. In addition, after navigating to the location of the property owner, the drone control device 110 may establish a set of contact standards to prevent injury and/or intimidation. For example, the drone control device 110 may maintain a specified distance from the property owner, approach users differently based on present circumstances and/or the type of user being approached.

In some implementations, the drone control device 110 is capable of monitoring and/or controlling the activities of the connected devices near or within the property 210. For instance, the drone control device 110 may periodically receive information from the devices of the system 100 such as the sensors 122, the HVAC components 124, the appliances 126, the cameras 128, and the auxiliary drone device 130. In response to receiving such information, the drone control device 110 may continuously monitor and adjust the activities of the devices of the system 100. In some instances, the drone control device 110 may use the received information to detect changes in the environment near or within the property 210. For example, the drone control device 110 may determine time points when occupants enter or exit the property 210, identify reoccurring activity patterns, and/or transmit activity reports to the application server 160. In another example, the drone control device 110 may determine whether present conditions are satisfied to initiate or terminate particular actions. For instance, the drone control device 110 may determine if one or more devices of the system 100 are presently malfunctioning, and in response, transmit a notification to either the user device 140 or the application server 160 to replace the device or schedule a maintenance appointment.

The drone control device 110 may use sensor data from the sensors 122 to control activities related to the property 210. In some instances, the drone control device 110 may receive sensor data that represents user activity from the sensors 122, and determine an optimized activity pattern based on the user activity data, and transmit instructions to operate the HVAC components 124 and the appliances 126 according to the optimized activity pattern. For example, the drone control device 110 may automate the operation of the HVAC components 124 and the appliances 126 to minimize energy consumption, or match with user-specified preferences (e.g., temperature light control). In other instances, the drone control device 110 may use sensor data from the sensors 122 to determine present conditions associated with the property 210. For example, the drone control device 110 may generate an infrared mapping of the property 210 that indicates locations of heat sources and the amount of heat generated. In response, the drone control device 110 may determine an average ambient temperature within the property 210.

The drone control device 110 may transmit information related to monitoring operations to the one or more users within the property (e.g., property owners). In some examples, the drone control device 110 may passively transmit periodic activity reports that include information over a particular period of time (e.g., daily, weekly, monthly, etc.). Alternatively, in other examples, the drone control device 110 may actively interact with the one or more users to directly communicate information related to the monitoring operations. For instance, the drone control device 110 may automatically navigate through the property 210 to locations of the users and display information on a user interface. In these examples, the drone control device 110 may either interact with the one or more users periodically during specified time periods, or based on the satisfaction of one or more conditions for providing information to the user (e.g., scheduling a maintenance appointment).

In some instances, the monitoring operations performed by the drone control device 110 may be coordinated by additional devices. For example, the drone control device 110 may coordinate monitoring operations with a physical security panel that additionally receives information from devices of the system 100. In such an example, the drone control device 110 may delegate a set of monitoring operations to the security panel to efficiently conserve computational resources of the drone control device 110. In another example, the drone control device 110 may coordinate monitoring operations with one or more subordinate helper drone devices (e.g., the auxiliary drone device 130), which perform a set of delegated monitoring operations in a coordinated manner. For instance, each of the one or more subordinate helper drone devices may be assigned to specific regions of the property 210 and relay information to the drone control device 110.

In some implementations, the drone control device 110 is capable of providing emergency response services during a detected alarm event at the property 210. For instance, the drone control device 110 may initially monitor data collected from devices of the system 100 and determine the presence of an alarm condition within the property 210. The alarm conditions may include fire or smoke within the property 210, a security breach within the property 210, or personal injuries requiring emergency medical services.

During an alarm event, the drone control device 110 may identify the locations of occupants within the property 210, determine the nearest emergency exits and take appropriate actions based on determining the present condition of the property 210. In some instances, the drone control device 110 may transmit a distress signal to remote devices (e.g., the user devices 140, 150, the applications server 160, etc.) to notify the appropriate individuals of the alarm event. For example, the distress signal may include an emergency category associated with the alarm event, spatial information related to the property 210, or other types of pertinent detected data from the devices of the system 100 (e.g., detected health and welfare information of occupants, sensor information, video footage during the alarm event, etc.).

The drone control device 110 may include various features to improve the transmission of life-critical data during an alarm event within the property 210. For example, in some instances, the drone control device 110 may be capable of backing up data received from the devices of the system 100 such that the application server 160 may access the backup data in the event that the drone control device 110 is damaged or destroyed during the alarm event. In another example, the drone control device 110 may include different software configurations to maximize the probability of data transmission to the application server 160 during an alarm event (e.g., increasing bandwidth for life-critical data transmissions while reducing resources for non-essential functions).

In addition, the drone control device 110 may be capable of using different network protocols to exchange electronic communications with the application server 160 during an alarm event. For example, after initially detecting an alarm event, the drone control device 110 may automatically enable video capture, navigate to the location of the alarm event and initiate a video conference with the application server 160 while navigating to the location of the alarm event. In another example, the drone control device 110 may include a control mechanism that enables the application server 160 to override controls of the drone control device 110 after detecting the presence of an alarm event. In another example, the drone control device 110 may be capable of using a backup network with the application server 160 (e.g., over a cellular network) in the event that the network 105 becomes inoperable due to damage to the property 210. In this example, the drone control device 110 may automatically adjust outgoing data transmissions to the application server 160 using the backup network based on determining that the network 105 may be inoperable.

The drone control device 110 may additionally be capable of performing a set of responsive actions to intelligently minimize the damage to the drone control device 110 during an alarm event. For instance, after detecting the presence of an alarm event, the drone control device 110 may identify, based on receiving detected data from the sensors 120, particular locations within the property 210 that are not susceptible to dangerous conditions, and then navigate to the particular locations. For example, if there is a fire on the second floor of the property 210, the drone control device 110 may navigate to an insulated region that is less likely to be burnt by the fire. In another example, the drone control device 110 may initially navigate to a safe region to transmit an alert indicating the alarm event to the application server 160, and then aggressively enter affected regions to search for occupants that may be in danger. In each of these examples, the drone control device 110 may utilize information gathered from the devices of the system 100 (e.g., spatial information related to the property 210, sensor information indicating present conditions, occupancy data indicating last-known locations of occupants, etc.) to make intelligent decisions on how to best take a set of actions to minimize injury of the occupants, increase the probability of transmitting an alert to the application server 160, and/or ensuring that the first responders have enough information to adequately address the alarm event within the property 210.

In some instances, where the detected alarm event is a security breach indicating that an intruder may have entered the property 210, the drone detector device 110 may include one or more security features to ensure the safety of occupants within the property 210. In some examples, the drone detector device 110 may be capable of performing offensive immobilization techniques (e.g., using a light flash to induce temporary blindness, releasing a noxious gas to induce unconsciousness, etc.). In other examples, the drone detector device 110 may be capable of performing defensive techniques to improve the likelihood to transmitting an alert indicating the security breach to the application server 160 (e.g., superficially appearing inoperable to prevent an intruder from damaging the device, retreating to a region inaccessible to the intruder, etc.).

In some implementations, the drone control device 110 may be capable of monitoring neighboring properties of the property 210 using similar techniques described above to monitor the property 210. For example, the drone control device 110 may monitor traffic inbound and outbound traffic patterns for a certain region surrounding the property 210 (e.g., a street, a community of properties, etc.), and identify anomalies based on routine activity patterns. In such examples, if the drone control device 110 detects a potential security breach in a neighboring property, the drone control device 110 may automatically transmit an alert notification to a local law enforcement agency and/or secure the property 210 from a similar security breach.

FIG. 3 illustrates an example of a process 300 for performing operations using a drone control device, for example, drone control device 110 of FIGS. 1 and 2. Briefly, the process 300 may include monitoring data generated by one or more devices within a property (310), determining an alarm status associated with the property based on monitoring the data (320), determining a location associated with a user based on monitoring the data (330), performing a particular operation at the location associated with the user (340), and transmitting a signal indicating the alarm status and the particular operation performed (350).

In more detail, the process 300 may include monitoring data generated by one or more devices within a property (310). For instance, the drone control device 110 may receive data generated by devices of the system 100. The generated data may include sensor data collected by the sensors 122, activity data associated with a HVAC system within the property 210, user activity data indicating when the occupant operates one or more of the appliances 126, video footage of the property 210 captured by the cameras 128, and/or the drone activity data associated with the auxiliary drone device 130 near the exterior of the property 210.

The process 300 may include determining an alarm status associated with the property based on monitoring the data (320). For instance, the drone control device 110 may determine the presence of an alarm event associated with the property 210 based on monitoring the data generated by the devices of the system 100. In some examples, the alarm event may be a security breach near the exterior of the property 210 indicating that an intruder may have trespassed, a health-related emergency indicating that an occupant inside the property 210 may require medical assistance, or a life-critical hazardous event near or within the property 210 indicating a fire or other types of the life-threatening accidents. In these examples, the drone control device 110 may passively determine the presence of the alarm event based on using pattern detection techniques to identify an anomaly within the property 210, or actively determine the presence of the alarm event based on periodically navigating regions of the property 210 and identifying an anomaly within the property 210.

The process 300 may include determining a location associated with a user based on monitoring the data (330).

For instance, the drone control device 110 may determine the locations of occupants within the property 210 based on data generated by the devices of the system 100. For example, the drone control device 110 may determine the locations of the occupants based on occupancy data within specified regions of the property 210, data indicating when one or more appliances 126 was last used by an occupant, and/or video footage depicting occupants within the field of views of the cameras 128. In other examples, in response to detecting the presence of an alarm event, the drone control device 110 may survey the different regions of the property 210 to determine the locations of the occupants.

The process 300 may include performing a particular operation at the location associated with the user (340). For instance, as described with respect to FIG. 2, the drone control device 110 may perform security and surveillance operations to preemptively secure the premises of the property 210, arming and disarming a monitoring system associated with the property 210, monitoring and controlling the activities of connected devices near or within the property 210, and/or provide emergency response services during a detected alarm event at the property 210. The particular operation performed by the drone control device 110 may be based on particular indicators within the data generated by the devices of the system 100, the particular category of alarm event identified by the drone control device 110, and/or the number of occupants present within the property 210.

The process 300 may include transmitting a signal indicating the alarm status and the particular operation performed (350). For instance, the drone control device 110 may transmit a signal to the application server 160 that includes information related to the alarm event, the particular operation performed by the drone control device 110, and/or any life-critical information associated with the occupants within the property 210. In other instances, the drone control device 110 may transmit the signal to the one or more user devices 140, 150 and/or other devices associated with emergency responders.

Figure 4A:
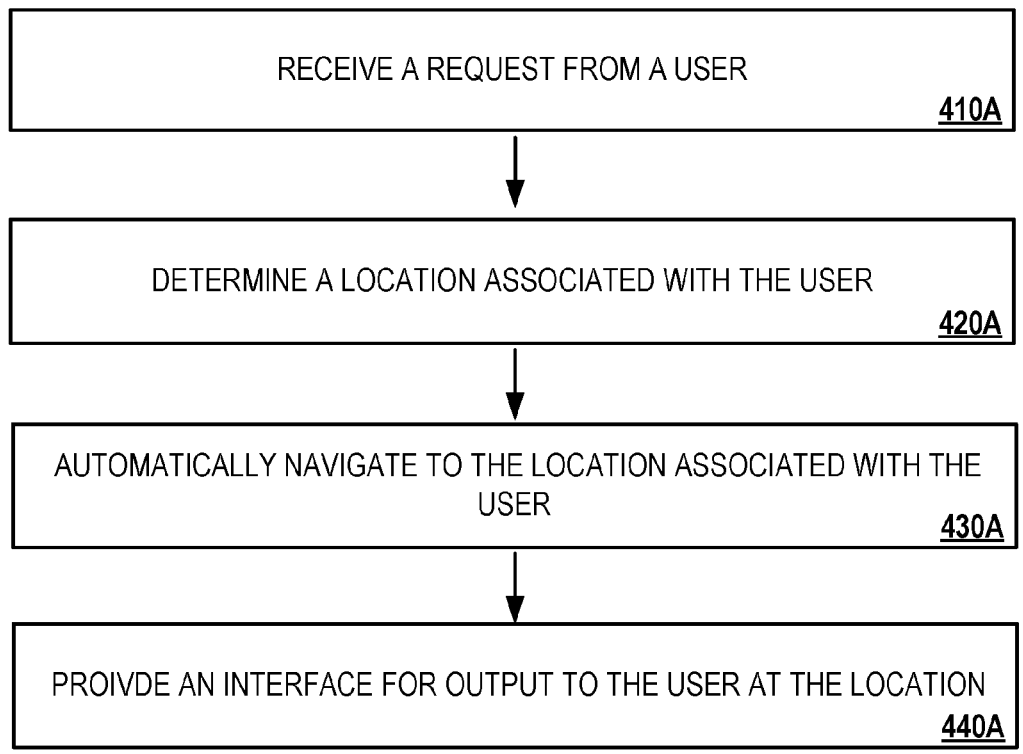
FIG. 4A illustrates an example of a process for automatically providing an interface for output by a drone control device to a specified user location.

FIG. 4A illustrates an example of a process 400A for automatically providing an interface for output by a drone control device to a specified user location. Briefly, the process 400A may include receiving a request from a user (410A), determining a location associated with the user (420A), automatically navigating to the location associated with the user (430A), and providing an interface for output to the user at the location (440A).

Figure 4B:
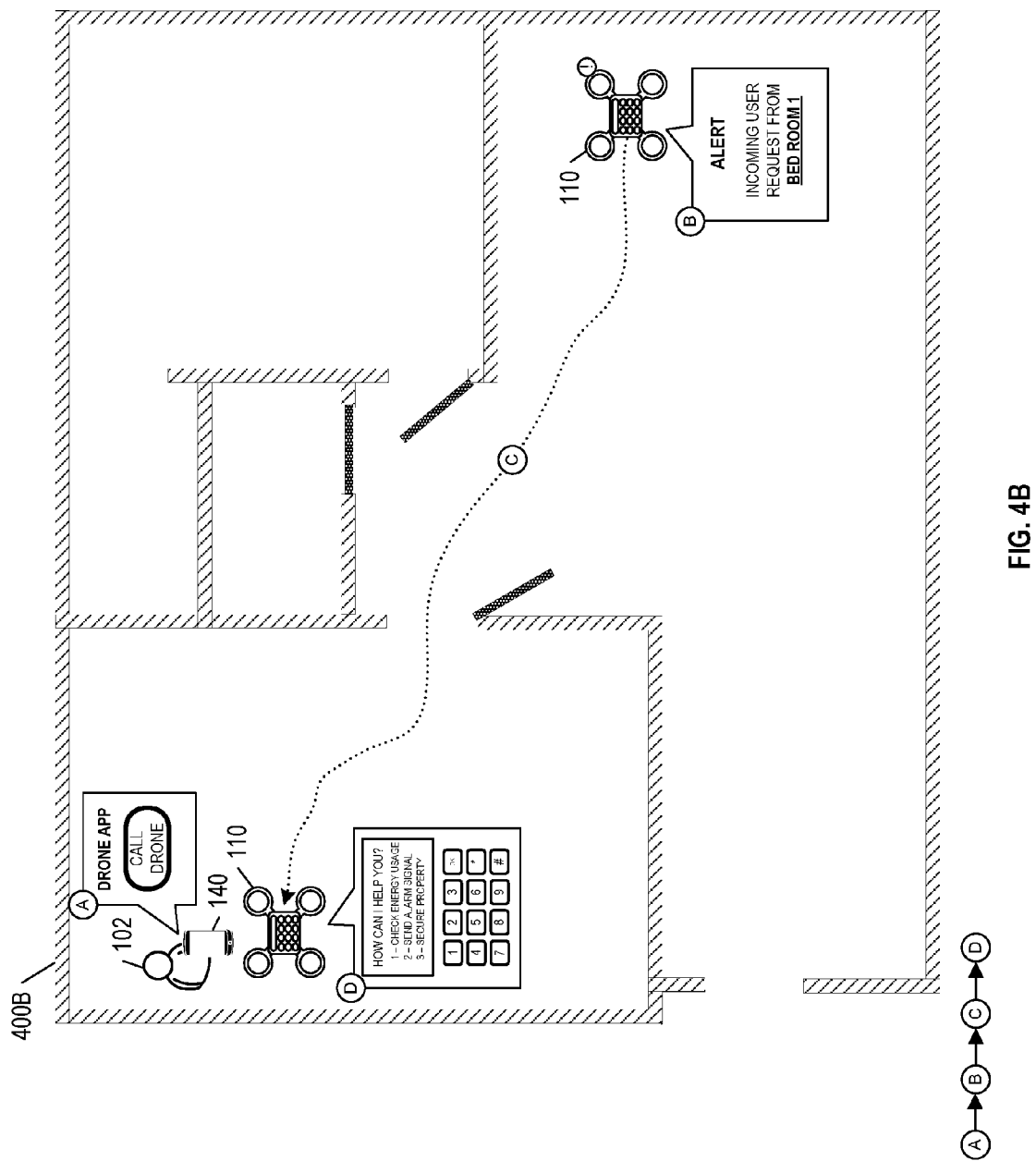
FIG. 4B illustrates a top view of a property where an example drone control device automatically provides an interface for output at a specified user location.

In more detail, the process 400A may include receiving a request from a user (410A). For instance, the drone control device 110 may receive a request from a device associated with a user (e.g., the user devices 140, 150) to perform a specified operation. For example, as illustrated in FIG. 4B, the user may use an application that runs on the user device to remotely summon the drone control device 110 to a specified location of the property. In other examples, the user may summon the drone using other techniques such as providing a specified voice query, performing a particular gesture if the user is within the line of sight of the drone control device 110, or performing a designated action on one or more devices that exchange communications with the drone control device 110.

The process 400A may include determining a location associated with the user (420A). For instance, the drone control device 110 may determine a location associated with the user based on receiving the request from the user. As described above, the drone control device 110 may use various techniques to determine the location of the user. For instance, if the received request is transmitted from a user device, the drone control device 110 may obtain location data collected by the user device to determine its location, which is presumed to be associated with the user. In other examples, the drone control device 110 may initiate wirelessly ping with the user device to identify the location of the wireless device. In other instances, where the user transmits the request by providing a voice query, the drone control device 110 may determine the user's location based on identifying a direction of audible sound produced in relation to the present location of the drone control device 110. For example, the drone control device 110 may use data collected by its on-board sensors (e.g., sound detectors, video camera, infrared sensors, etc.) in order to identify the location associated with the user.

In some implementations, the drone control device 110 may additionally or alternatively exchange communications with one or more devices located within the property in determining the location of the user. For instance, in response to receiving the user's request, the drone control device 110 may obtain data recently collected by the sensors 122, the appliances 126, and/or the cameras 128 in order to predict a location of the user. For example, video footage collected from the cameras 128 in different regions of the property can be used to identify a location of the user. In other examples, presence and/or motion detection data collected by the sensors 122 can be used to determine movement patterns of the user through different regions of the property. In yet another example, the drone control device 110 may obtain activity data from the appliances 126 to identify locations of appliances that were recently used by the user.

The process 400A may include automatically navigating to the location associated with the user (430A). For instance, after determining the location associated with the user, the drone control device 110 may automatically navigate to the determined location. As described above, the drone control device 110 may use various techniques to move about the property. For example, the drone control device 110 may fly, roll, walk, or hover from its current location within the property to the determined location associated with the user.

The process 400A may include providing an interface for output to the user at the location (440A). For instance, after the drone control device 110 has automatically navigated to the location associated with the user, the drone control device 110 may provide a user interface that displays information related to operations related to the system 100. The user interface may either be displayed on a display of the drone control device 110, or on the display on the user device 140. In some examples, the user interface may present the user with options to perform common operations associated with the property such locking the exits of the property, alarming the security system of the property, adjusting the set point temperature of the HVAC system, among others. In other examples, the user interface may provide information that is responsive to a user's request for information related to the property (e.g., current set point temperature, energy consumption patterns, users that are detected to be occupying the property, etc.).

In some implementations, the drone control device 110 may be capable of interacting with the user after navigating to the user's location. The drone control device 110 may be capable of using language processing and speech recognition techniques to parse speech queries provided by the user, and performing actions responsive to the speech queries. For instance, the user may provide commands for the drone control device 110 to perform a specified action, and the in response, the drone control device 110 may be capable of translating the speech command into an executable command to perform the specified action. As an example, a user may transmit routine commands to perform routine actions related to the property such as confirming whether a particular individual is at home or not, confirming the operational status of an appliance 126 within the property, or commands to initiate electronic communications with other devices located within the property such as turning lights on/off, arming or disarming a security system, or performing a network connectivity check for a local network within the property.

FIG. 4B illustrates a top view of a property 400B where the drone control device 110 automatically provides an interface for output at a specified user location. The illustrated example proceeds according to a sequence of steps "A," "B," "C," and "D" depicted in the figure. At step (A), a user initially provides a request to summon the drone control device 110 to his/her location. At step (B), in response to receiving the user's request, the drone control device 110 determines a location associated with the user 102. At step (C), the drone control device 110 then automatically navigates to the determined location for the user 102. At step (D), once the drone control device 110 has reached the user's location, the drone control device 110 provides a user interface for output to the user.

At step (A), a user 102 initially transmits a request to summon the drone control device 110 to his/her location within the property. In the example illustrated, the user 102 utilizes a drone control application that runs on a user device 140 to transmit a summoning request. The user input received on the drone control application is then transmitted to the drone device 110 either through a local network such as the network 105, or through communications with an associated server such as the application server 160.

In some implementations, the user 102 may use the drone control application to remotely transmit other types of commands that do not necessarily require the drone control device 110 to navigate to the user's location. For example, the user 102 may use the drone control application to transmit an instruction to control the operation of the appliances 126, obtain and provide sensor data collected by the sensors 122, adjust heating/cooling operations of the HVAC components 124, or provide activity reports related to the property 400B. In these examples, the drone control device 110 may perform the actions specified by user input on the application without actually navigating to the user's location.

Although FIG. 4B illustrates the transmission of a user request using a mobile application, in some implementations, the user 102 may summon the drone control device 110 to his/her location using other techniques. For instance, the user 102 may transmit a voice command or instruction, that, when heard by the drone control device 110, causes the drone control device 110 to automatically determine and navigate to the user's location. For example, the voice command may include specified terms, phrases, or utterance patterns that are recognizable by an automated speech recognition module of the drone control device 110. Additionally, if the user 102 is within the line of sight of the drone control device 110 (e.g., in the same room), the user 102 may also provide specified gestures that are recognizable by the drone control device 110 in order to summon the drone control device 110.

At step (B), the drone control device 110 receives and recognizes the user's request and then determines a user's location within the property 400B. In the example illustrated, the drone control device 110 obtains an alert signal indicating that the user 102 has transmitted a request through the drone control application, and in response, the drone control device 110 identifies that the user 102 is presently located in "BEDROOM 1" of the property 400B. As described above, the drone control device 110 may determine the user's location using a variety of techniques. In some instances, data collected by devices located within the property can be used to predict a present location of the user 102 with the use of motion sensor data, presence and occupancy data, and/or user activity data within the property 400B. In other instances, data collected by on-board sensors of the drone control device 110 can also be used to determine a user's location. For example, the drone control device 110 may have sound sensors that are configured to identify a direction of a sound source corresponding to a user's voice command. In another example, the drone control device 110 may perform a surveying operation in different regions to property and identify a user's location when he/she is visually detected by on-board cameras of the drone control device 110.

At step (C), the drone control device 110 automatically navigates to the determined location for the user 102 within the property 400B. As described above, the drone control device 110 may use various techniques to move between a starting point and an ending point of the property 400B.

At step (D), once the drone control device 110 navigates to the user's location within the property 400B, the drone control device 110 may provide a user interface that enables the user 102 to perform various operations of the system 100 described above in FIG. 1. The user interface may either be presented on a display of the drone control device 110, or transmitted to the user device 140 for display through the control application. In the examples depicted, the interface allows the user 102 to check the energy usage by devices within the property 400B. For instance, as described above in FIGS. 1 and 2, the drone control device 110 may monitor the activity of devices of the system 100 (e.g., the sensors 122, the HVAC components 124, the appliances 126, the cameras 128, etc.). The drone control device 110 may also aggregate activity data over specified periods of time (e.g., hourly, daily, weekly, etc.) in order to identify activity patterns related to usage, energy consumption, among others. The interface illustrated in the FIG. 4B therefore allows the user to check monitoring information related to the system 100 without having to navigate to a fixed location within the property. In the other examples illustrated, the user 102 may use the drone control device 110 to send an alarm signal to another user or to a designated authorized entity, or secure the property 400B by adjusting the security status or by locking all of the entrances/exits of the property 400B.

In some implementations, the user interface provided by the drone control device 110 enables the user 102 to interact with the drone control device 110 in addition to selecting commands to perform operations related to the system 100. The user interface may enable the user 102 to use the drone control device 110 as a companion device to request and view information related to the property 400B. For example, the user 102 may select a "security information" option on the drone control application, and then view collected security footage and/or any detect security intrusion events on the user interface of the drone control device 110 once it has been summoned in response to the request transmitted through the drone control application. In this regard, because the drone control device 110 monitors and routes data associated with the system 100, the user interface presented on the drone control device 110 can be used to provide additional information that may not be available directly on the user device 140.

Figure 5B:
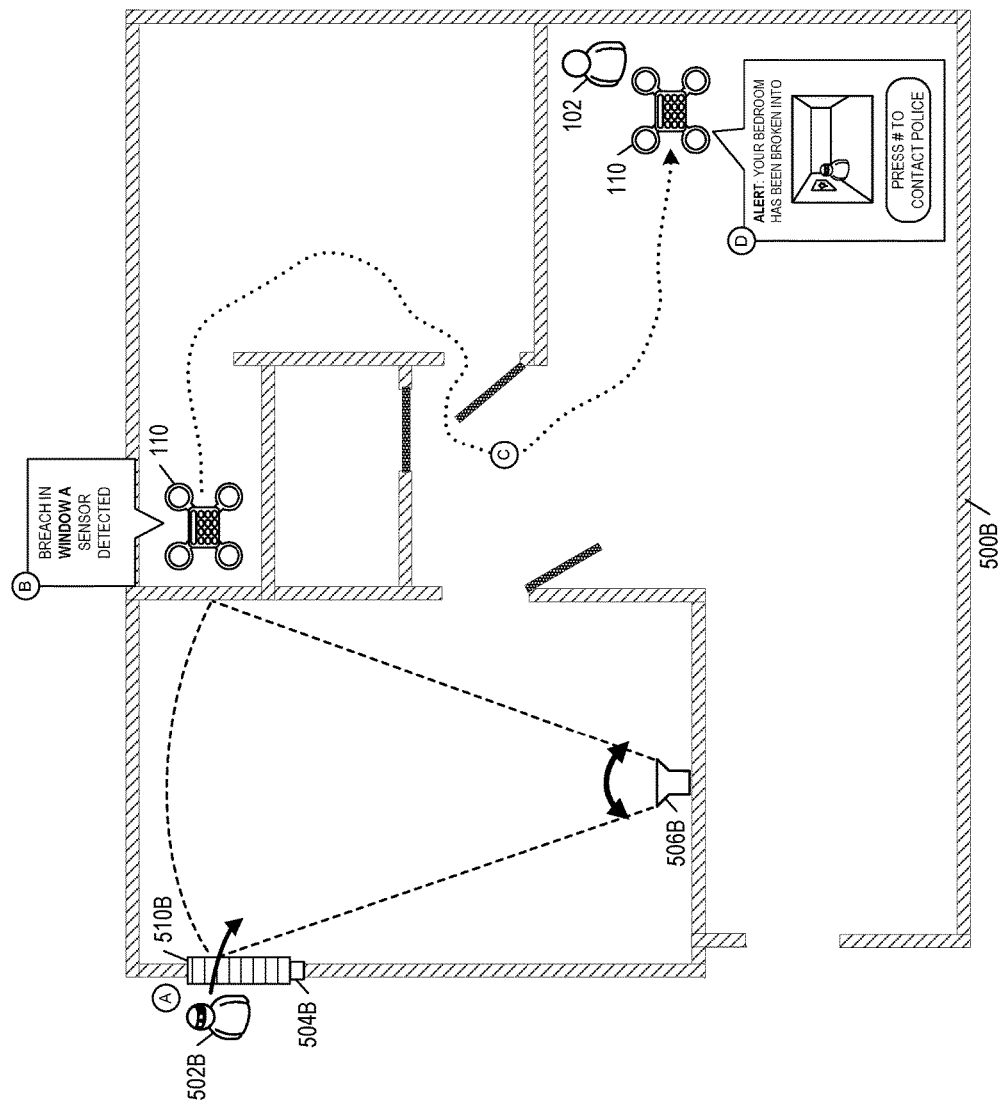
FIG. 5B illustrates a top view of a property where an example drone control device automatically performs an emergency action.
Figure 6B:
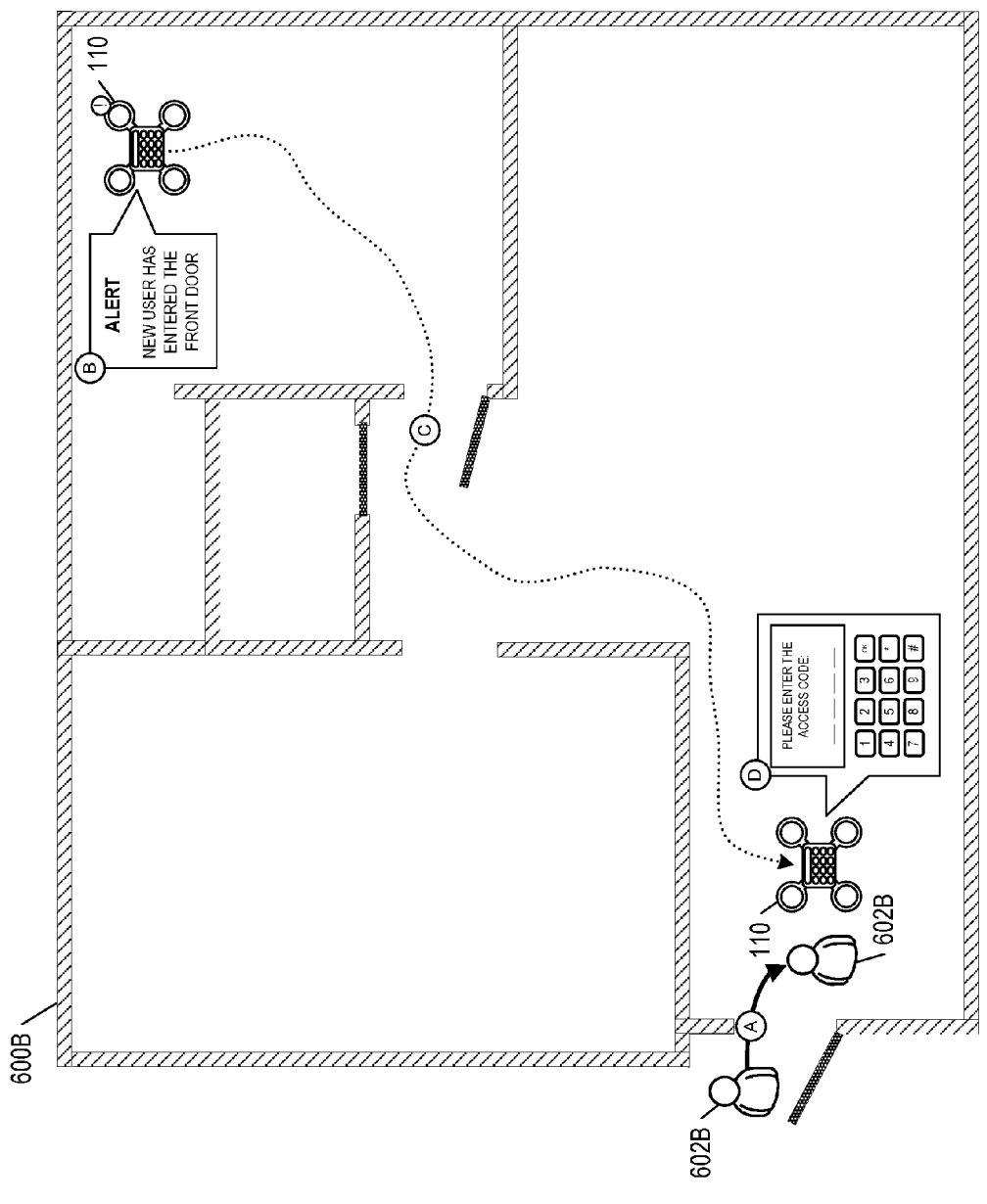
FIG. 6B illustrates a top view of a property where an example drone control device automatically verifies the identity of a user who enters a property

For example, this additional information can include detected user activity patterns (e.g., set point temperature history for a connected thermostat, operation of connected appliances within the property), or supporting information associated with user activity (e.g., energy consumption resulting from HVAC heating and cooling patterns related to the set point temperature, monthly electricity or water consumption over a specified timer period). Other examples of additional information are illustrated in FIGS. 5B and 6B below. For example, additional information may relate to a detected emergency condition at the property (e.g., toxic carbon monoxide levels, excessive temperature or smoke levels indicating a fire). In other examples, additional information may include information related to a detected security breach (e.g., location and time point of a detected intrusion, captured security video footage of the intrusion).

In addition to providing additional information, the user interface provided by the drone control device 110 (e.g., through a display of the drone control device 110 or through the user device 140) enables the user to transmit commands for the drone control device 110 to perform specified operations related to a security system of the property. Examples of such operations include adjusting an alarm status of the security system (e.g., from "unarmed" to "armed" or "stay"), locking/unlocking electronic locks of entrances or exits of the property, transmitting emergency alert notifications to other users (e.g., emergency contacts, first responders, law enforcement agencies), or routine monitoring operations related to the security system (e.g., verifying device status, optimizing device operations, or aggregating, presenting, or storing monitored device information).

FIG. 5A illustrates an example of a process 500A for automatically performing an emergency action using a drone control device. Briefly, the process 500A may include obtaining data indicating a security breach at a property (510A), in response, determining a location of a user within the property (520A), automatically navigating to the location associated with the user (530A), and providing an interface for performing an emergency action to the user at the location (540A).

In more detail, the process 500A may include obtaining data indicating a security breach at a property (510A). For instance, the drone control device 110 may obtain collected data from one or more of the sensors 122 indicating a security breach at the property. Examples of sensor data indicating a security breach can include irregular motion detected near the exterior of the property, data indicating a forced intrusion through a door or window, or a manual input from a user indicating an alarm condition.

Additionally, or alternatively, data indicating a security breach can be obtained from on-board sensors of the drone control device 110. For example, a camera of a drone control device 110 may capture video footage of an intruder entering the premises of a property while performing a designated surveillance operation of the property.

The process 500A may include determining a location of a user within the property (520A). The user may be some type of authorized user (e.g., a property owner, an occupant) that has permission and/or authorization to occupy the property. The drone control device 110 may use similar techniques as those as described above in step 420A of FIG. 4A, the drone control device 110 to determine a user's location within the property in response to detecting a security breach within the property. In some implementations, the drone control device 110 may use similar techniques to also identify the location of the security breach within the property.

In some implementations, after determining the location of the user that presently occupies the property and the location of the security breach within the property, the drone control device 110 may also determine if the detected security breach poses a potential danger to the user. For example, the drone control device 110 may evaluate the danger posed based on a proximity between the user's location and the location of the security breach and/or the severity of the security breach based on upon its location within the property. If the drone control device 110 determines that there is significant danger posed by the security breach (e.g., high proximity between the user's location and the location of the security breach), the drone control device 110 may then perform responsive actions to reduce the danger posed. For example, the drone control device 110 may attempt to divert an intruder away from the user's location using an audible alarm signal.

The process 500A may include automatically navigating to the location associated with the user (530A). For instance, the drone control device 110 may automatically navigate to the user's location using similar techniques as described above in step 430 of FIG. 4A. In some implementations, the drone control device 110 may additionally, or alternatively, automatically navigate to the location of the security breach. For example, as described above, in some instances, the drone control device 110 may preemptively navigate to the location of the security breach to deter an intruder in order to reduce an amount of risk posed to a user that presently occupies the property. In another example, if the user that presently occupies the property is sleeping and/or otherwise unaware of the detected security breach, the drone control device 110 may automatically navigate to location of the user in order to notify him/her of the detected security breach.

The process 500A may include providing an interface for performing an emergency action to the user at the location (540A). For instance, after automatically navigating to the location of the user, the drone control device 110 may generate a user interface that provides information related to performing an emergency action. The user interface may be presented on a display of the drone control device 110 or transmitted to the user device 140 for display through an associated application and/or webpage. In some examples, the user interface may provide the user with collected sensor data associated with the detected security breach (e.g., location of a detected intrusion, captured video footage of a region where the intrusion took place, etc.). In other examples, the user interface may provide options for the user to seek emergency assistance (e.g., sending an alert notification to an emergency contact and/or a law enforcement agency).

In some implementations, the drone control device 110 may perform other emergency actions in addition to, or as an alternative to, providing the user interface for output to a user that occupies the property. For instance, the drone control device 110 may engage an intruder to deter him/her from continuing to intrude the property, capture video footage of the detected intrusion, transmit alert notifications to law enforcement entities, generate an audible alarm sound, transmit instructions to enable security features of the property, among others. In addition, the drone control device 110 may perform these emergency actions automatically in response to the detected security breach at the property, or in response to commands transmitted locally or remotely by the user.

FIG. 5B illustrates a top view of a property 500B where the drone control device 110 automatically performs an emergency action. The illustrated example proceeds according to a sequence of steps "A," "B," "C," and "D" depicted in the figure. At step (A), a sensor 504 and/or a camera 506B detects an intruder 502B through a window 510B of the property 500B. At step (B), data collected by the sensor 504B and the camera 506B are obtained by the drone control device 110, and in response, the drone control device 110 detects a likely security breach at the property 500B. The drone control device 110 also determines a location associated with a user 102 that presently occupies the property 500B. At step (C), the drone control device 110 then automatically navigates to the determined location for the user 102. At step (D), once the drone control device 110 has reached the user's location, the drone control device 110 performs an emergency action. In the example illustrated, the user 102 may be some type of authorized user (e.g., a property owner, an occupant) that has permission and/or authorization to occupy the property.

At step (A), the sensor 504B and/or the camera 506B initially detects the intruder 502 entering the property through the window 510B. In the example illustrated, the sensor 504 is a motion sensor that detects motion through the window 510B and the camera 506B is a security camera that periodically captures video footage of a bedroom of the property. Once detected, the sensor 504B and the camera 506B may generate an event flag associated with the detected motion and captured sensor data associated with the detected motion. For example, the sensor 504B may identify the window through which the intruder 502B has entered, and the camera 506B may capture video footage of the room where the window is located. The captured data is then transmitted to the drone control device 110.

At step (B), once the drone control device 110 received the data collected by the sensor 504B and/or the camera 506B, the drone control device 110 initially determines that the detected activity is unauthorized and represents a security breach within the property. In some instances, this determination can be based on, for example, determining that the detected motion is irregular by comparing the detected motion against historical sensor data associated with the sensor 504B and the camera 506B. In other instances, the determination may additionally or alternatively be based on the motion being detected at an irregular time point (e.g., 3 AM) or if the type of activity recorded within the camera 506B indicates that the individual that has entered through the window 510B is a perpetrator. In other instances, the detected motion may be determined to be an intrusion based on the alarm status of the property 500B.

After determining that the collected sensor data represents a security breach, the drone control device 110 then identifies a location of the user 102 that presently occupies the property using techniques described above with respect to FIG. 4B.

In some implementations, the drone control device 110 may additionally or alternatively determine a location associated with the detected security breach within the property 500A. For instance, as described above, the location of the security breach may be identified based on the location of the sensor that captures the irregular activity within the property. In the example illustrated, the drone control device determines the nature of the security breach (e.g., a breach in the window), and the location of the security breach (e.g., bedroom) based on obtaining sensor data from the sensor 504B placed on the window 510B and the camera 506B, which records video footage of the bedroom.

In some instances, where the property 500B is determined to be vacant because the user 102 is not home when the security breach is detected, instead of determining a location of the user 102, the drone control device 110 may instead perform another emergency action. For example, the drone control device 110 may automatically transmit an alert notification indicating the detected security breach to the user 102 and/or a law enforcement agency. In other examples, the drone control device 110 may confront the intruder 502B, or generate an audible alarm sound to deter the intruder 502B from the property 500B.

At step (C), the drone control device 110 automatically navigates to the determined location for the user 102 within the property 500B. As described above, the drone control device 110 may use various techniques to move between a starting point and an ending point of the property 500B.

At step (D), once the drone control device 110 navigates to the user's location within the property 500B, the drone control device 110 performs a specified emergency action. In the example illustrated, the drone control device 110 provides a notification to the user 102. The notification includes an alert indicating the nature of the security breach (e.g., a type of intrusion, location of the intrusion) and a video footage of the location of the intrusion captured by the camera 506. The alert notification also provides the user 102 with an option to transmit a distress signal to a law enforcement agency.

As described above, the drone control device 110 may perform emergency actions in addition to, or as an alternative to, providing the alert notification to the user 102. For instance, the drone control device 110 may take various actions to deter the intruder 502B away from the property. For example, the drone control device 110 may generate an audible alarm sound, adjust the operation of devices located within the property to mimic the user's activity near the location of the detected security breach, or automatically turning lights on near the location.

FIG. 6A illustrates an example of a process 600A for using a drone control device to verify the identity of a user that enters a property. Briefly, the process 600A may include obtaining data indicating that a user has entered a property (610A), determining that another user associated with the property is not presently located within the property (620A), automatically navigating to an entrance location of the user (630A), and performing a verification operation to verify that the user is authorized to enter the property (640A).

In more detail, the process 600A may include obtaining data indicating that a user has entered a property (610A). For instance, the drone control device 110 may obtain data indicating that a user has recently entered the property through the front door or any other entrance associated with the property. In some instances, the obtained data is collected by a motion sensor that is placed on the entrance through which the user enters the property and then transmitted to the drone control device 110. The entrance therefore need not be within the line of sight of the drone control device 110 when the user enters the property. The user can either be an intruder, or an authorized user that has permission and/or authorization to occupy the property. As discussed below, the drone control device 110 performs a set of operations to verify the user's identity in order to determine if the user is an intruder or an authorized user.

In other instances, where the entrance is within the line of sight of the drone device 110, the obtained data may additionally, or alternatively, be data collected by on-board sensors of the drone control device 110. For example, a camera of the drone control device 110 may determine that a user has entered into the property based on capturing video footage indicating that a user has entered the property through an entrance within its field of view.

The process 600A may include determining that another user associated with the property is not presently located within the property (620A). For instance, the drone control device 110 may determine that the property is presently vacant when a user is detected to have entered to the property. This determination may be based on obtaining motion and/or presence data and processing it to determine whether the property is presently occupied by other users. Alternatively, the determination may also be based on detecting the presence of user devices of authorized users that are pre-associated with a monitoring system of the property. If the drone control device 120 is unable to identify sensor data and/or communication transmissions associated with authorized users and/or their associated devices, then the drone control device 110 determines that the property is presently vacant.

In instances where the property is not vacant and occupied by other users, the drone control device 110 may determine whether the users that occupy the property are authorized users (e.g., adults with sufficient privileges). In such instances, the drone control device 110 may perform different actions based on whether the users that presently occupy the property are authorized or not. For example, if an authorized user currently occupies the property, the drone control unit 110 may terminate the operation described below for verifying the identity of a user that recently entered the property as described below. Alternatively, if a child currently occupies the property, the drone control device 110 may instead perform the operations described below since the user that recently entered the property may be an intruder. In some implementations, the drone control device 110 may determine to perform the verification operations described below based on a current status associated with a user that currently occupies the property. For example, if a user is determined to be sleeping and/or occupied by another activity and unable to notice that a user has entered the property, the drone control device 110 may still perform the verification operation even though an authorized user is determined to be present within the property when another user recently enters the property. In another example, if the user that occupies the property is determined to be location in a region of the property where he/she may not have heard the doorbell, then the drone control device 110 may similarly perform the verification operation as described below. In this regard, the drone control device 110 may determine to perform the verification operation based on either the type of user present within the property, the status of the user, and/or the location of the user within the property.

The process 600A may include automatically navigating to an entrance location nearby the user (630A). For instance, if the drone control device 110 determines to perform a verification operation, the drone control device 110 automatically navigates to a nearby location of the entrance where the user is detected to have entered the property. The drone control device 110 may use similar navigational and movement techniques to those described above.

The process 600A may include performing a verification operation to verify that the user is authorized to enter the property (640A). For instance, once the drone control device 110 has navigated to the entrance location nearby the user, the drone control device 110 may perform a verification operation to verify that the user that has recently entered the property is authorized to do so. In some implementations, the verification operation involves providing a user interface for the user to provide an access code associated with the monitoring system of the property. In such implementations, the drone control unit 110 operates analogously to a traditional security panel that requires a user to provide an access code to prevent the generation of an alarm for unauthorized access.

In other implementations, the drone control device 110 may capture biometric or image data of the user in order to automatically verify the identity of a user without requiring any type of manual user input such as key presses for an access code. For example, the drone control device 110 may capture a facial image of the user and use facial recognition techniques to determine if the user is included within a list of authorized users that are permitted to enter into the property. In another example, drone control device 110 may collect one or more of a fingerprint, a retinal scan, or some other type of biometric data of the user and then compare the captured biometric data to a repository of biometric data for authorized users who are permitted to access the property. In each of these examples, the drone control device 110 may determine that the user is authorized to enter the property if collected image or biometric data matches corresponding reference data for an authorized data, indicating that the user has previously entered the property. In other instances, the authorized user may be an individual that has not previously entered the property but is otherwise granted permission and/or authority to enter the property (e.g., an independent contractor hired by a property owner, a real estate agent associated with a listing for the property, etc.).

In some implementations, the drone control device 110 may perform additional actions if it is unable to verify the user's identity. For example, if the user is unable to provide the correct access code, the drone control device 110 may request answers to predetermined security questions that are associated with the property owner's account. In other instances, if the user who enters the property is not the property owner or the resident, the drone control device 110 may initiate a video or audio conference between the user that has entered into the property and the property owner/resident in order to obtain confirmation that the user is permitted to enter the property.

In some implementations, the drone control device 110 may alternate between performing operations of the process 600A and the operations of the process 500A described in FIG. 5A. In some instances, if the drone control device 110 is unable to verify the identity of the user that recently enters the property, the drone control device 110 may automatically identify the user as an intruder (e.g., the intruder 502B as illustrated in FIG. 5B). In such instances, the drone control device 110 may then reconfigure itself to perform the operations of the process 500A. In other instances, this reconfiguration may take placed on based, for example, the present conditions of the property when the user is detected to have entered the property (e.g., if there are vulnerable users presently occupying the property), or the security/alarm status of the monitoring system of the property when the user is detected to have entered the property.

FIG. 6B illustrates a top view of a property 600B where the drone control device 110 automatically verifies the identity of a user 602B that enters a property 600B. The illustrated example proceeds according to a sequence of steps "A," "B," "C," and "D" depicted in the figure. At step (A), the user 102 enters the property 600B through its front door. At step (B), the drone device 110 obtains data indicating that the user 102 has entered the property 600B. At step (C), the drone control device 110 then automatically navigates to an entrance location nearby the user 102. At step (D), once the drone control device 110 has reached the entrance location, the drone control device 110 performs a verification operation to verify the identity of the user 102 and determine if he/she is authorized to enter into the property 600B.

In the example, the user 602B may either be an authorized user that has permission and/or authorization to enter the property 600B, or an intruder that does not have permission and/or authorization to enter the property 600B. In some instances, when the user 602B initially enters the property 600B, the drone control device 110 may not be automatically capable of determining the identity of the user 602B, and therefore, performs the verification operation described below in order to determine whether the user 602B is in fact an authorized user or an intruder. In other instances, which are not illustrated in the figure, where the user 602B is a property owner or an occupant that frequently occupies the property 600B, the drone control device 110 is automatically able to verify the identity of the user 602B, and therefore, does not perform the operations illustrated in FIG. 6B.

At step (A), a user 602B initially enters the property 600B through a suitable entrance. In the example illustrated, the user 602B enters the property 600B through its front door. In other instances, the user 602B may also enter the property through other entrances (e.g., back door, side door, etc.).

At step (B), the drone control device 110 determines that the user 602B has recently entered the property. In some instances, this determination is based on obtaining data collected by one or more motion sensors nearby the entrance that was opened by the user 602B. In other instances, where the entrance that was opened is within the line of sight of the drone control device 110, this determination may additionally, or alternatively, based on data collected by on-board sensors of the drone control device 110. For example, video footage captured by a camera of the drone control device 110 that indicates that an entrance within its field of view has been opened can be used to determine that a user has recently entered the property 600B. In addition, in some instances where the property 600B includes multiple entrances, the obtained data from the sensors 122 and/or the on-board sensors can also be used to determine entrance location near the user 602B.

At step (C), the drone control device 110 automatically navigates to the entrance location near the user 602B. As described above, the drone control device 110 may use various techniques to move between a starting point and an ending point of the property 600B.

At step (D), once the drone control device 110 has reached the entrance location, the drone control device 110 performs a verification operation to verify the identity of the user 102 and determines if he/she is authorized to enter into the property 600B. In the example illustrated, the verification operation includes requesting the user 602B to input an access code for the security system of the property 600B. In this example, the drone control device 110 may be used by the user 602B as a security panel for disabling the alarm status of the security system when a user is detected to have entered the property. Additionally, or alternatively, in other implementations, the drone control device 110 may perform other types of verification operations as described above in relation to FIG. 5A. For example, the drone control device 110 may capture an image or biometric data of the user 602B, and then compare the captured data to reference data for a list of authorized users that are associated with the property 600B. The drone control device 110 can then determine that the user 602B is authorized to enter the property if the captured data matches the reference data for an authorized user.

Figure 7:
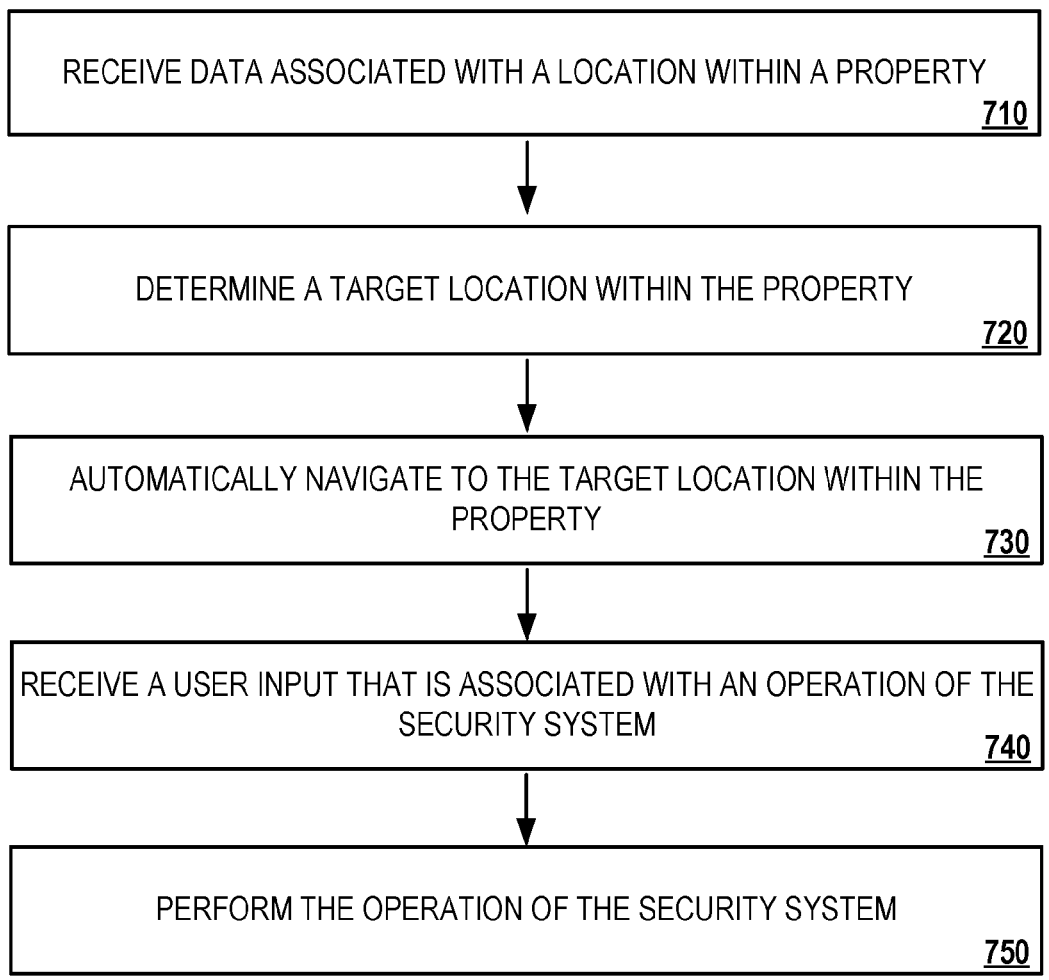
FIG. 7 illustrates an example of a process for performing operations of a security system using a drone control device.

In some implementations, the drone control device 110 may perform additional actions if it is unable to verify the user's identity. For example, if the user is unable to provide the correct access code, the drone control device 110 may request answers to predetermined security questions that are associated with the property owner's account. In some instances, if the user 602B that enters the property is not the property owner or the resident, the drone control device 110 may initiate a video or audio conference between the user that has entered into the property and the property owner/resident in order to obtain confirmation that the user is permitted to enter the property. In other instances, if the drone control device 110 is unable to identify the verify user's identity by any of these techniques, the drone control device 110 may instead enter an alarm status and determine that the user 602B is an intruder. In such instances, the drone control device 120 may perform the operations described above in FIG. 5A, and illustrated in FIG. 5B. FIG. 7 illustrates an example of a process 700 for performing operations of a security system using a drone control device. Briefly, the process 700 may include receiving data associated with a location within a property (710), determining a target location within the property (720), automatically navigating to the target location within the property (730), receiving a user input that is associated with an operation of the security system (740), and performing the operation of the security system (750).

In more detail, the process 700 may include receiving data associated with a location within a property (710). For instance, the drone control device 110 may obtain data associated with a location within the property 210. The obtained data may include, for example, data indicating a request from a user to perform a specified operation as depicted in FIG. 4B, data indicating a detected security breach at the property as depicted in FIG. 5B, or data indicating that a user has recently entered the property as depicted in FIG. 6B.

In other instances, the drone device 110 may obtain other types of data that are not illustrated in figures described above. For example, the drone control device 110 may also obtain sensor data routine collected the sensors 122, activity data associated with the HVAC components 124, operation data associated with the appliances 126, or data transmissions from other drone devices located within the property such as the auxiliary drone device 130.

The process 700 may include determining a target location within the property (720). For instance, as described in the examples above, the target location within the property 210 may be associated with a location of a user that transmits a request to perform a specified operation as depicted in FIG. 4B, a location of a detected security breach as depicted in FIG. 5B, or an entrance location nearby a user who enters the property as depicted in FIG. 6B. The drone control device 110 may determine the target location within the property 210 based on, for example, data collected by the sensors 122, the appliances 126, the cameras 128, and/or the auxiliary drone device 130 that indicate present conditions of the property, exchanging data communications with the user device 140, or data collected by on-board sensors of the drone control device 110.

The process 700 may include automatically navigating to the target location within the property (730). For instance, as described in the examples above, after determining the target location within the property 210, the drone control device 110 may automatically navigate to the target location. The drone control device 110 may use various techniques to move about the property 210 such as flying, walking, or rolling.

The process 700 may include receiving a user input that is associated with an operation of the security system (740). For instance, as described in the examples above, the drone control device 110 may receive user input that is associated with an operation of the system 100. For example, the drone control device 110 may receive a user input selecting an operation to be performed on a user interface displayed in response to a transmitted user request as depicted in FIG. 4B, a user input relating to performing an emergency action in response to a detected security breach at the property 210 as depicted in FIG. 5B, or a user input including an access code to indicate that a user that has entered a property is authorized to do so as depicted in FIG. 6B. In each of these examples, the received user input may either be received on a user interface displayed to the user (e.g., through a display associated with the drone control device 110), received using any other type of human-machine interface (e.g., using an automated speech recognizer for a speech query input, or optical recognition of gesture input). In other examples, a combination of these systems may also be used (e.g., a gesture input provided through a device).

The process 700 may include performing the operation of the security system (750). For instance, as described in the examples above, the drone control device 110 may perform a specified operation of the system 100 associated with a received user input. For example, the operation may include checking the energy usage by devices within the property, generating an alarm signal, or security exits/entrances of the property 210 based on a user selection on a user interface as depicted in FIG. 4B. In other examples, the operation may include transmitting a distress signal indicating a detected security breach within the property or engaging an intruder in response to a user instruction as depicted in FIG. 5B. In other examples, the operation may include authorizing a user that who recently entered the property based on a user input indicating an access code as depicted in FIG. 6B.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A drone control device comprising:
a body;
a motor that is configured to move the body and navigate the body within an interior environment of a property;
a network module that is configured to:
communicate with a security system that monitors the property; and
receive data associated with a location within the interior environment of the property;
an input module that is configured to receive user input;
a controller module that is configured to control operations of one or more devices of the security system; and
a processor that is configured to:
determine, from among the location within the property and other locations within the property, a target location within the interior environment of the property;
move the body to the target location within the interior environment of the property by providing a signal to the motor;
receive, from the input module, input data that is associated with an operation of the security system; and
in response to receiving the input data, perform the operation of the security system.

2. The drone control device of claim 1, wherein the input module comprises:
a display that is configured to display data in response to instructions from the processor; and
a keypad that is configured to provide keypress data to the processor.

3. The drone control device of claim 1, further comprising:
one or more sensors that are configured detect environmental conditions in a vicinity of the drone control device.

4. The drone control device of claim 3, wherein the one or more sensors comprise at least a camera and a presence sensor.

5. The drone control device of claim 1, wherein determining, from among the location within the property and other locations within the property, a target location within the property is based on the data associated with the location within the property and data received from the input module.

6. The drone control device of claim 1, wherein:
the drone control device is part of the security system, and
performing an operation of the security system includes performing an operation of the drone control device.

7. A computer-implemented method comprising:
receiving, by a drone control device that is associated with a security system that monitors a property, data associated with a location within an interior environment of the property, wherein the drone control device is configured to control operations of one or more devices of the security system;
based on the data associated with the location within the interior environment of the property, determining, from among the location and other locations within the property, a target location within the interior environment of the property;
automatically navigating, by the drone control device, to the target location within the interior environment of the property;
receiving, by the drone control device, a user input that is associated with an operation of the security system; and
performing, by the drone control device, the operation of the security system.

8. The method of claim 7, wherein:
receiving data associated with a location within the property comprises receiving, from a user device at the location within the property, a request that the drone control device navigate to the location;
the target location within the property comprises the location of the user device within the property; and
the method further comprises:
after automatically navigating to the location of the user device within the property, providing, for display on the drone control device, a user interface that identifies the operation of the security system and one or more additional operations of the security system.

9. The method of claim 8, wherein the operation of the security system and the one or more additional operations of the security system comprise:
checking energy usage of an additional device that communicates with the security system;
sending an alarm signal; or
securing the property.

10. The method of claim 7, wherein:
receiving data associated with a location within the property comprises receiving, from one or more sensors of the security system, data indicating a security breach at the location within the property;
the target location within the property comprises a location of a user within the property; and
the method further comprises:
after automatically navigating to the location of the user, providing, for display on the drone control device, a user interface associated with the security breach.

11. The method of claim 10, wherein the user interface identifies the location of the security breach within the property.

12. The method of claim 10, wherein:
the user interface includes a selectable option to notify a third party of the security breach;
receiving a user input that is associated with an operation of the security system comprises receiving data indicating a selection of the selectable option to notify the third party of the security breach; and performing the operation of the security system comprises notifying the third party.

13. The method of claim 7, wherein:
receiving data associated with a location within the property comprises receiving sensor data indicating a user has entered the property;
the target location within the property comprises a location where the user has entered the property; and
performing the operation of the security system comprises verifying that the user who has entered the property is authorized to enter the property.

14. The method of claim 13, wherein verifying that the user who has entered the property is authorized to enter the property comprises:
receiving user input indicating an access code;
comparing the received access code to a verified access code; and
determining whether the user who has entered the property is authorized to enter the property based on comparing the received access code to the verified access code.

15. The method of claim 12, wherein verifying that the user who has entered the property is authorized to enter the property comprises:
obtaining biometric data of the user who has entered the property;
obtaining reference biometric data associated with one or more authorized users of the property;
comparing the reference biometric data to the biometric data of the user who has entered the property; and
determining whether the user who has entered the property is authorized to enter the property based on comparing the reference biometric data to the biometric data of the user who has entered the property.

16. A non-transitory computer-readable storage device encoded with computer program instructions that, when executed by one or more computers, cause the one or more computers to perform operations comprising:
receiving, by a drone control device that is associated with a security system that monitors a property, data associated with a location within an interior environment of the property, wherein the drone control device is configured to control operations of one or more devices of the security system;
based on the data associated with the location within the interior environment of the property, determining, from among the location and other locations within the property, a target location within the interior environment of the property;
automatically navigating, by the drone control device, to the target location within the interior environment of the property;
receiving, by the drone control device, a user input that is associated with an operation of the security system; and
performing, by the drone control device, the operation of the security system.

17. The non-transitory computer-readable storage device of claim 16, wherein:
receiving data associated with a location within the property comprises receiving, from a user device at the location within the property, a request that the drone control device navigate to the location;
the target location within the property comprises the location of the user device within the property; and
the operations performed by the one or more computers further comprise:

after automatically navigating to the location of the user device within the property, providing, for display on the drone control device, a user interface that identifies the operation of the security system and one or more additional operations of the security system.

18. The non-transitory computer-readable storage device of claim 17, wherein the operation of the security system and the one or more additional operations of the security system comprise:
- checking energy usage of a device that communicates with the security system;
- sending an alarm signal; or
- securing the property.

19. The non-transitory computer-readable storage device of claim 16, wherein:
- receiving data associated with a location within the property comprises receiving, from one or more sensors of the security system, data indicating a security breach at the location within the property;
- the target location within the property comprises a location of a user within the property; and
- the operations performed by the one or more computers further comprise:
  - after automatically navigating to the location of the user, providing, for display on the drone control device, a user interface associated with the likely security breach.

20. The drone control device of claim 1, wherein the processor is configured to determine the target location within the interior environment of the property from among the location within the property and other locations within the property by determining, based on data obtained from one or more sensors of the security system, that a location of a user within the property is the target location.

* * * * *